United States Patent
Fujii et al.

(10) Patent No.: US 7,591,888 B2
(45) Date of Patent: Sep. 22, 2009

(54) PORPHYRAZINE COLORING MATTER, INK, INK SET AND COLORED ARTICLE

(75) Inventors: Takafumi Fujii, Kita-ku (JP); Yoshiaki Kawaida, Kita-ku (JP)

(73) Assignee: Nippon Kayaku Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/223,559

(22) PCT Filed: Feb. 8, 2007

(86) PCT No.: PCT/JP2007/052212

§ 371 (c)(1),
(2), (4) Date: Aug. 1, 2008

(87) PCT Pub. No.: WO2007/091631

PCT Pub. Date: Aug. 16, 2007

(65) Prior Publication Data

US 2009/0029120 A1    Jan. 29, 2009

(30) Foreign Application Priority Data

Feb. 10, 2006  (JP) ............................. 2006-033625

(51) Int. Cl.
*C09D 11/02* (2006.01)
*C07D 487/22* (2006.01)
*B41J 2/01* (2006.01)

(52) U.S. Cl. ..................... 106/31.47; 540/126; 347/100

(58) Field of Classification Search ............. 106/31.47; 540/126; 347/100; 428/195.1
See application file for complete search history.

(56) References Cited

U.S. PATENT DOCUMENTS

| | | | |
|---|---|---|---|
| 6,238,827 B1 * | 5/2001 | Nakazawa et al. ............. 430/7 |
| 7,097,701 B2 * | 8/2006 | Tateishi et al. ........... 106/31.47 |
| 7,132,012 B2 * | 11/2006 | Tateishi et al. ........... 106/31.47 |
| 7,270,701 B2 * | 9/2007 | Jinnou et al. ............. 106/31.47 |
| 7,282,090 B2 * | 10/2007 | Osumi et al. ............. 106/31.47 |
| 7,419,537 B2 * | 9/2008 | Fujii et al. ................ 106/31.47 |
| 2002/0128249 A1 * | 9/2002 | Cook ......................... 540/124 |
| 2006/0201382 A1 * | 9/2006 | Ozawa et al. ............ 106/31.47 |
| 2006/0268086 A1 * | 11/2006 | Kawakami et al. .......... 347/100 |
| 2008/0274286 A1 * | 11/2008 | Yamashita et al. ....... 106/31.47 |
| 2009/0047430 A1 * | 2/2009 | Mori et al. ................. 347/100 |
| 2009/0151599 A1 * | 6/2009 | Fujii et al. ................ 106/31.47 |

FOREIGN PATENT DOCUMENTS

EP    1 741 756    1/2007
WO    2005/021658    3/2005

OTHER PUBLICATIONS

The International Search Report dated May 15, 2007.

\* cited by examiner

*Primary Examiner*—Helene Klemanski
(74) *Attorney, Agent, or Firm*—Nields, Lemack & Frame, LLC

(57) ABSTRACT

The present invention relates to a porphyrazine coloring matter represented by the following formula (1):

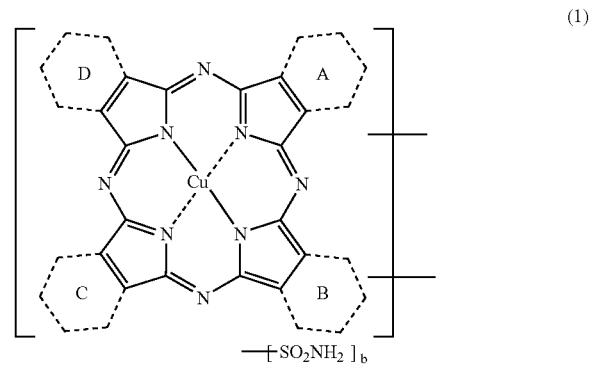

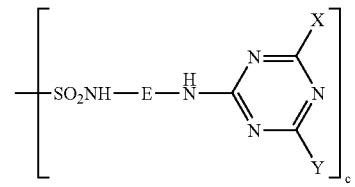

(wherein, A, B, C and D independently represent a 6-membered ring having aromaticity, at least one or more of them are benzene rings and at least one or more of them contain nitrogen-containing heteroaromatic rings; E represents alkylene, X is a substituted anilino group and have at least one or more of sulfo group, carboxy group and phosphono group as a substituent, Y represents a hydroxy group or an amino group, b is respectively 0 to 2.9, c is 0.1 to 3, and the sum of b and c is 1 to 3) in free acid form, which is suitable for inkjet recording because it has good hue as a cyan ink, is excellent in light fastness, ozone fastness and moisture fastness, and does not cause bronzing phenomenon.

21 Claims, No Drawings

PORPHYRAZINE COLORING MATTER, INK, INK SET AND COLORED ARTICLE

TECHNICAL FIELD

The present invention relates to a novel porphyrazine coloring matter, an ink, an ink set, a method for inkjet recording using this ink or this ink set and a colored article.

BACKGROUND ART

Recently, materials to form color images have particularly been a mainstream as an image recording material, and specifically recording materials for the inkjet method, thermal transfer type image recording materials, recording materials using an electrophotographic method, transfer type silver halide photosensitive materials, printing inks, recording pens and the like are frequently used. In addition, color filters are used for LCD (liquid crystal display) and PDP (plasma display panel) in displays and for electronic parts such as CCD (charge coupled device) in photographing equipment. These color image recording materials and color filters employ coloring matters (dyes or pigments) of three primary colors for so-called additive color process and subtractive color process in order to reproduce or record full color images, but it is the case that there is no coloring matter which has absorption characteristics to achieve a preferable color reproduction area and is durable under various use conditions, so their improvement is strongly desired.

The inkjet recording method has been rapidly prevailing and further growing because the material cost is inexpensive, rapid recording is possible, noise in recording is less and also color recording is easy. The inkjet recording method includes the continuous method where ink droplets are continuously flown and the on-demand method where ink droplets are flown responding to an image information signal, and its discharge method includes a method where ink droplets are discharged by applying a pressure to piezoelectric elements and a method where bubbles are generated in ink by heating to discharge ink droplets, a method using an ultrasonic waves, a method where ink droplets are sucked and discharged by electrostatic force, or the like. Further, examples of ink suitable for inkjet recording include water-based inks, oil-based inks, solid (hot melt type) inks or the like.

Requirements on a coloring matter to be used for ink suitable for such inkjet recording are that it has good solubility or dispersibility in solvent; allows high density recording and has a good hue; is durable against light, heat and active gases (oxidizing gases such as NOx and ozone, and other gases such as SOx) in the environment; has excellent fastness against water and chemicals, good fixation on record-receiving materials, resistance to bleeding, excellent storage stability as an ink and no toxicity; also is inexpensively available, and so on. In particular, a cyan coloring matter is strongly desired which has a good hue of cyan, is excellent in light fastness (durability against light), ozone fastness (durability against ozone gas) and moisture fastness (durability under high humidity), and does not exhibit bronze phenomenon (which is also called bronzing phenomenon). Bronze phenomenon means a glare phenomenon caused by that coloring matter is aggregated on the surface of glossy paper due to association or aggregation of coloring matter or insufficient absorption of ink into medium, and has metallic luster. If this phenomenon occurs, all the aspects such as glossiness, print quality and print density are inferior.

The typical skeleton for water-soluble cyan coloring matters to be used suitable for inkjet recording is phthalocyanine or triphenylmethane skeletons. The typical phthalocyanine coloring matter to be most widely reported and utilized includes phthalocyanine derivatives which are classified into the following A to H.

A: known phthalocyanine coloring matters such as Direct Blue 86, Direct Blue 87, Direct Blue 199, Acid Blue 249 and Reactive Blue 71

B: the phthalocyanine coloring matters described in Patent Literatures 1 to 3 and the like (for example, a mixture of $Cu\text{-}Pc\text{-}(SO_3Na)m(SO_2NH_2)n$: m+n=1 to 4)

C: the phthalocyanine coloring matter described in Patent Literature 4

(for example, $Cu\text{-}Pc\text{-}(CO_2H)m(CONR_1R_2)n$: m+n=a number of 0 to 4)

D: the phthalocyanine coloring matter described in Patent Literature 5

(for example, $Cu\text{-}Pc\text{-}(SO_3H)m(SO_2NR_1R_2)n$: m+n=a number of 0 to 4, and m≠0)

E: the phthalocyanine coloring matter described in Patent Literature 6

(for example, $Cu\text{-}Pc\text{-}(SO_3H)l(SO_2NH_2)m(SO_2NR_1R_2)n$: l+m+n=a number of 0 to 4)

F: the phthalocyanine coloring matter described in Patent Literature 7

(for example, $Cu\text{-}Pc\text{-}(SO_2NR_1R_2)n$: n=a number of 1 to 5)

G: the phthalocyanine coloring matters described in Patent Literatures 8, 9, 12 and the like (phthalocyanine compounds where the substitution position of the substituent is controlled and phthalocyanine coloring matters where a substituent is introduced into the β-position)

H: benzopyridoporphyrazine coloring matters having a pyridine ring and a benzene ring described in Patent Literatures 10, 13, 14 and the like Phthalocyanine coloring matters recently used widely in general which are represented by Direct Blue 86 and Direct Blue 199 have a characteristic that they are excellent in light fastness compared with magenta coloring matters and yellow coloring matters which are known in general. Phthalocyanine coloring matters are not so preferred as a cyan ink because they have a greenish hue under acidic conditions. Therefore, these coloring matters are preferably used under neutral to alkali conditions when used as a cyan ink. However, if a record-receiving material to be used is acidic paper, it is possible that the hue of printed matters change largely even though the ink is neutral to alkali.

In addition, if a phthalocyanine coloring matter is used a cyan ink, the print density is decreased because the hue of printed matters is changed to a greenish color as well as color fading occurs because of oxidizing gases such as nitrogen oxide gas and ozone which are often raised as an environmental issue in recent years.

On the other hand, triphenylmethane coloring matters have a good hue, but are very inferior in light fastness, ozone fastness and moisture fastness.

Hereafter, inkjet recording will have a larger application field and be also used widely for articles on exhibition in advertisement and the like, resulting that coloring matters and inks to be used there will be more and more strongly required to have a good hue and be inexpensive as well as excellent in light fastness, active gas fastness in the environment and moisture fastness because they are more often exposed to light and active gases (oxidizing gases such as NOx and ozone, and other gases such as SOx). It is, however, difficult to develop a cyan coloring matter (for example, a phthalocyanine coloring matter) and a cyan ink satisfying these requirements at a high level. So far, phthalocyanine coloring matters provided with active gas fastness are disclosed in Patent Literatures 3, 8 to 12 and 14, but any cyan coloring matter or cyan ink has not yet been achieved which satisfies all such qualities as hue, light fastness, ozone fastness and moisture fastness, does not exhibit bronze phenomenon, and can also be inexpensively produced. Therefore, the market requirements have not yet been sufficiently satisfied.

[Patent Literature 1] JP S62-190273
[Patent Literature 2] JP H7-138511
[Patent Literature 3] JP 2002-105349
[Patent Literature 4] JP H5-171085
[Patent Literature 5] JP H10-140063
[Patent Literature 6] JP H11-515048
[Patent Literature 7] JP S59-22967
[Patent Literature 8] JP 2000-303009
[Patent Literature 9] JP 2002-249677
[Patent Literature 10] JP 2003-34758
[Patent Literature 11] JP 2002-80762
[Patent Literature 12] WO 2004/087815
[Patent Literature 13] WO 2002/034844
[Patent Literature 14] JP 2004-75986

DISCLOSURE OF THE INVENTION

Problems to be Solved by the Invention

The present invention has an object to solve the above problems and provide a novel coloring matter which has a good hue as a cyan ink, is excellent in light fastness, ozone fastness and moisture fastness, and does not exhibit bronze phenomenon; and also to provide an ink suitable for inkjet and an inkjet recording method, using said coloring matter.

Means of Solving the Problems

The inventors of the present invention have studied various coloring matters which has a good hue and high light and ozone fastnesses, and does not exhibit bronze phenomenon, found out that a certain porphyrazine coloring matter represented by formula (1) described afterward can solve the above problems, and completed the present invention.

That is, the present invention relates to;

(1) A porphyrazine coloring matter represented by the following formula (1) in free acid form

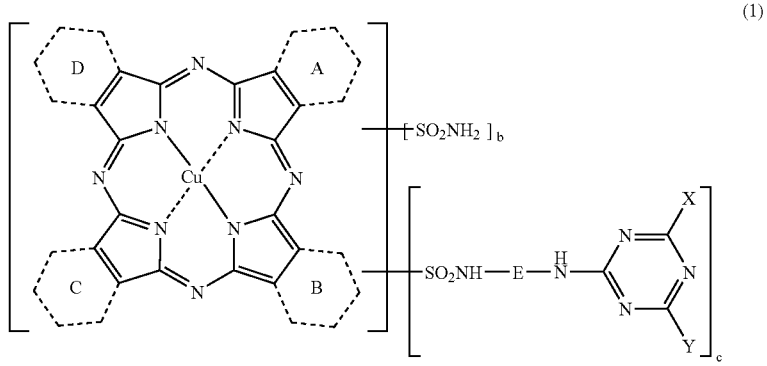

(wherein, A, B, C and D independently represent a 6-membered ring having aromaticity, at least one of them is a benzene ring and at least one of the rest represents a nitrogen-containing heteroaromatic ring, E represents alkylene, X is a sulfo-substituted anilino group, a carboxy-substituted anilino group or a phosphono-substituted anilino group, said substituted anilino group may further have 0 to 4 substituents of one or more kinds selected from the group consisting of a sulfo group, a carboxy group, a phosphono group, a sulfamoyl group, a carbamoyl group, a hydroxy group, an alkoxy group, an amino group, an alkylamino group, a dialkylamino group, an arylamino group, a diarylamino group, an acetylamino group, a ureide group, an alkyl group, a nitro group, a cyano group, halogen, an alkylsulfonyl group and an alkylthio group, Y represents a hydroxy group or an amino group, b is 0 to 2.9, c is 0.1 to 3, and the sum of b and c is 1 to 3), (2) The porphyrazine coloring matter according to (1), wherein the nitrogen-containing heteroaromatic ring is a pyridine ring or a pyrazine ring, (3) The porphyrazine coloring matter according to (1) or (2), which is obtained by reaction of a porphyrazine compound represented by the following formula (3) and organic amine represented by the following formula (4) in the presence of ammonia

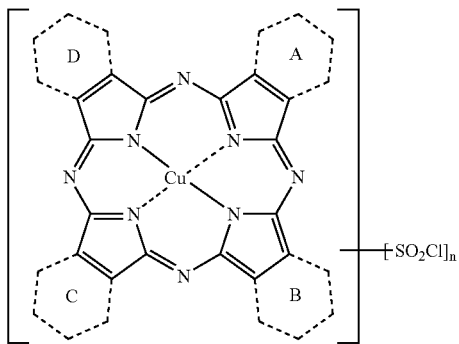

(wherein, A, B, C and D have the same meanings as described in (1), and n is 1 to 3)

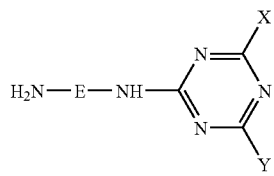

(wherein, E, X and Y have the same meanings as described in (1)), (4) The porphyrazine coloring matter according to (2), wherein 1 to 3 of A, B, C and D are pyridine rings or pyrazine rings, E represents C2 to C4 alkylene, X is a sulfo-substituted anilino group, a carboxy-substituted anilino group or a phosphono-substituted anilino group, said substituted anilino group may have 0 to 3 substituents of one or more kinds selected from the group consisting of a sulfo group, a carboxy group, a phosphono group, a hydroxy group, an alkoxy group, a nitro group and a chlorine atom, Y represents a hydroxy group or an amino group, b is 0 to 2.9, c is 0.1 to 3, and the sum of b and c is 1 to 3), (5) The porphyrazine coloring matter according to (4), wherein E represents ethylene or propylene, X is a sulfo-substituted anilino group or a carboxy-substituted anilino group, Y represents an amino group, b is 0 to 2.9, c is 0.1 to 3, and the sum of b and c is 1 to 3, (6) The porphyrazine coloring matter according to (1), wherein A is a pyridine ring fused at the 2-position and the 3-position or at the 3-position and the 4-position, or a pyrazine ring fused at the 2-position and the 3-position, B is a pyridine ring fused at the 2-position and the 3-position or at the 3-position and the 4-position, or a pyrazine ring fused at the 2-position and the 3-position or a benzene ring, C is a pyridine ring fused at the 2-position and the 3-position or at the 3-position and the 4-position, or a pyrazine ring fused at the 2-position and the 3-position or a benzene ring, D is a benzene ring, E is a C2 to C4 alkylene, X is an anilino group having 1 to 3 substituents selected from the group consisting of a sulfo group, a carboxy group, a methoxy group, a nitro group, a chlorine atom and a hydroxy group, Y is an amino group or a hydroxy group, b is 0 to 2.9, and c is 0.1 to 3, (7) The porphyrazine coloring matter according to (1) or (2) represented by the following formula (2) in free acid form

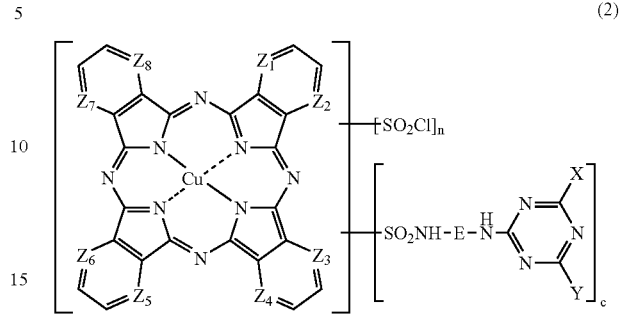

(wherein, each of $Z_1$ to $Z_8$ independently represents a nitrogen atom or a carbon atom, and further at least one of the combinations of $Z_1$ and $Z_2$, $Z_3$ and $Z_4$, $Z_5$ and $Z_6$ and $Z_7$ and $Z_8$ is a combination of carbon atoms and at least one of the rest combinations is a combination of a carbon atom and a nitrogen atom or a combination of nitrogen atoms, E, X, Y, b and c have the same meanings as in the formula (1)), (8) The porphyrazine coloring matter according to (7), which is obtained by reaction of a porphyrazine compound represented by the following formula (5) and organic amine represented by the formula (4) described in (3) in the presence of ammonia

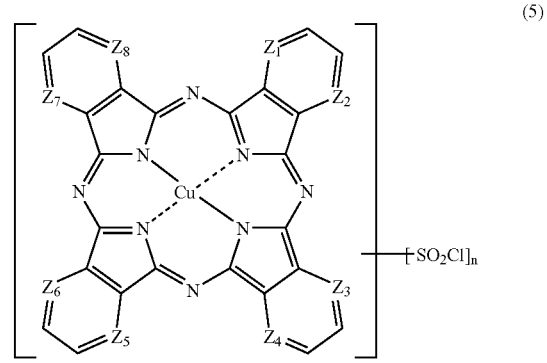

(wherein, $Z_1$ to $Z_8$ have the same meanings as described in (7), and n is 1 to 3), (9) A mixture of coloring matter containing the porphyrazine coloring matter according to any one of (1) to (8) and the salts thereof,

(10) A mixture of the porphyrazine coloring matter according to any one of (1) to (8) and a phthalocyanine coloring matter,

(11) An ink characterized by containing the porphyrazine coloring matter or the mixture of coloring matter according to any one of (1) to (10),

(12) The ink according to (11), which contains an organic solvent together with the porphyrazine coloring matter,

(13) The ink according to (11) or (12), which is for inkjet recording,

(14) An inkjet recording method characterized by using the ink according to any one of (11) to (13) as ink or an ink set containing the ink in a inkjet recording method where ink droplets are discharged responding to a recording signal to perform recording on a record-receiving material,

(15) The inkjet recording method according to (14), wherein the record-receiving material is a communication sheet,

(16) The inkjet recording method according to (15), wherein the communication sheet is a sheet applied with a surface treatment and has an ink image receiving layer containing white inorganic pigment particles on its support,

(17) A container containing the ink according to any one of (11) to (13),

(18) An ink jet printer having the container according to (17),

(19) A colored article colored with the ink according to any one of (11) to (13),

(20) The porphyrazine coloring matter according to (1), which is a mixture of a porphyrazine coloring matter where one of A, B, C and D is a nitrogen-containing heteroaromatic ring and the other three are benzene rings and a porphyrazine coloring matter where two of A, B, C and D are nitrogen-containing heteroaromatic rings and the other two are benzene rings,

(21) The porphyrazine coloring matter according to (20), wherein the nitrogen-containing heteroaromatic ring is a pyridine ring.

EFFECT OF THE INVENTION

An ink using the compound of the present invention is an ink which has a good hue as a cyan ink and is excellent in light fastness, ozone fastness and moisture fastness. In addition, it exhibits no crystal precipitation or no change in physical properties and color after storage for a long period of time, so it has good storage stability. Further, it can show a color tone in a wide visible region when used together with other magenta ink and yellow ink. Therefore, a cyan ink using the porphyrazine coloring matter of the present invention is extremely useful as an ink for inkjet recording.

BEST MODE FOR CARRYING OUT THE INVENTION

The present invention will be specifically explained. The ink suitable for inkjet recording of the present invention is characterized by containing a porphyrazine coloring matter of the above formula (1). That is, it is found out that a porphyrazine coloring matter where 1 to 3 among 4 benzo rings of tetrabenzoporphyrazine (which is usually called phthalocyanine) are replaced by nitrogen-containing heteroaromatic rings for use as the mother nucleus of the coloring matter and an unsubstituted sulfamoyl group and a certain substituted sulfamoyl group are introduced is very suitable for ink for inkjet, and that recorded articles with an ink using said coloring matter have an excellent fastness against ozone gas and hardly exhibit bronze phenomenon.

The nitrogen-containing heteroaromatic ring of A, B, C and/or D in the above formula (1) includes, for example, nitrogen-containing heteroaromatic rings containing 1 to 2 nitrogen atoms such as a pyridine ring, a pyrazine ring, a pyrimidine ring and/or a pyridazine ring. Among them, a pyridine ring or a pyrazine ring is preferable and a pyridine ring is the most preferable. Of A, B, C and D, 1 to 3 are nitrogen-containing heteroaromatic rings and the rest are benzene rings. As the number of nitrogen-containing heteroaromatic rings is increased, ozone fastness is improved but bronzing resistance is apt to occur, therefore it is advisable that the number of nitrogen-containing heteroaromatic rings is accordingly controlled to select a well balanced ratio in view of ozone fastness and bronzing resistance. The number of nitrogen-containing heteroaromatic rings also varies depending on the kind of heterocycles and could not be definitively suggested, however typically, it is preferably in the range of 1 to 2, more preferably 1.1 to 1.75 and further preferably 1.1 to 1.5, on the average. The rest are benzene rings.

When the number of nitrogen-containing heteroaromatic rings is more than 1 and less than 2, it is the average number of heterocycles in a mixture of a compound having 1 heterocycle and a compound having 2 heterocycles.

When the number of heterocycles is 2, it can be considered that any of the compounds is produced where they are side by side (for example, A and B) and where they are opposite (for example, A and C). The compounds described in the structural formulas in the explanation of producing process and the examples are, unless otherwise specifically noted, represented, for convenience, by one structural formula of a compound where two of A and C are heterocycles, B and D are benzene rings, showing all the compounds including both compounds produced as above, because it is bothersome and hard to understand to intentionally describe all of them and because it is not necessary to intentionally distinguish them in the present invention.

The alkylene in E includes, for example, alkylene having 2 to 12 carbon atoms and more preferably alkylene having 2 to 6 carbon atoms. The specific examples include ethylene, propylene, butylene, pentylene, hexylene, cyclopropylenediyl, 1,2- or 1,3-cyclopentylenediyl and 1,2-, 1,3- or 1,4-cyclohexylene. Preferable is ethylene, propylene or butylene. More preferable is ethylene or propylene, and further preferable is ethylene.

X is a sulfo-substituted anilino group, a carboxy-substituted anilino group or a phosphono-substituted anilino group, and said anilino group may further have 0 to 4, preferably 0 to 2 substituents of one or more kinds selected from the group consisting of a sulfo group, a carboxy group, a phosphono group, a sulfamoyl group, a carbamoyl group, a hydroxy group, an alkoxy group, an amino group, an alkylamino group, a dialkylamino group, an acetylamino group, a ureide group, an alkyl group, a nitro group, a cyano group, halogen, an alkylsulfonyl group and alkylthio group. X specifically includes, for example, 2,5-disulfoanilino, 2-sulfoanilino, 3-sulfoanilino, 4-sulfoanilino, 2-carboxyanilino, 4-ethoxy-2-sulfoanilino, 2-methyl-5-sulfoanilino, 2-methoxy-4-nitro-5-sulfoanilino, 2-chloro-5-sulfoanilino, 3-carboxy-4-hydroxyanilino, 3-carboxy-4-hydroxy-5-sulfoanilino, 2-hydroxy-5-nitro-3-sulfoanilino, 4-acetylamino-2-sulfoanilino, 4-anilino-3-sulfoanilino, 3,5-dicarboxyanilino, 2-carboxy-4-sulfamoylanilino, 2,5-dichloro-4-sulfoanilino, 3-phosphonoanilino or the like. Y is preferably a hydroxy group or an amino group and more preferably an amino group.

The preferable compound in the present invention can include a compound where the number of nitrogen-containing heteroaromatic rings is 1 to 2, the nitrogen-containing heteroaromatic ring is a pyridine ring or a pyrazine ring and more preferably a pyridine ring, the range of b is 0 to 2.9, c is 0.1 to 3, the sum of b and c is 1 to 3 and more preferably 2 to 3, E is C2 to C4 alkylene and more preferably ethylene, X is a sulfo-substituted anilino group, a carboxy-substituted anilino group or a phosphono-substituted anilino group and said substituted anilino group may have 0 to 3 substituents of one or more kinds selected from the group consisting of a sulfo group, a carboxy group, a phosphono group, a hydroxy group, an alkoxy group, a nitro group and a chlorine atom, and Y is a hydroxy group or an amino group. In addition, a further preferable compound is a compound where X is an anilino group having 1 to 2 sulfo substituents and more preferably 2 sulfo groups, and Y is an amino group, in the above. Further, as for the range of b and c, b is in the range of 0.5 to 2.5, c is in the range of 0.1 to 1.5, and the sum of b and c is more preferably in the range of 2 to 3, in the above. Furthermore, b>c is typically preferable.

The compound shown in free acid of the above formula (1) can also form a salt utilizing a sulfo group, a carboxy group and/or a phosphono group or the like it has in a molecule. All the compounds represented by the above formula (1) when shown in free acid form are included in the present invention, and salts of the compound represented by the formula (1) are included in the present invention. The salt of the compound of the formula (1) is preferably a salt of an inorganic or organic cation. Examples of the salt include an alkali metal salt, an alkali earth metal salt and an ammonium salt. Preferable among them is an alkali metal salt, specifically a salts of lithium, sodium or potassium.

The alkali earth metal of the alkali earth metal salt includes, for example, calcium, magnesium and the like. The organic amine includes, for example, lower alkylamines having 1 to 3 carbon atoms such as methylamine and ethylamine, mono-, di- or tri-(lower alkanol) amines (having 1 to 4 carbon atoms) such as monoethanolamine, diethanolamine, triethanolamine, monoisopropanolamine, diisopropanolamine and triisopropanolamine. The preferable salt includes an alkali metal salt such as sodium salt, potassium salt and lithium salt, and an onium salt of mono-, di- or tri- (lower alkanol) amines (having 1 to 4 carbon atoms) such as monoethanolamine, diethanolamine, triethanolamine, monoisopropanolamine, diisopropanolamine and triisopropanolamine and an ammonium salt.

Specific examples of A, B, C, D, E, X and Y and the numbers of b and c in the porphyrazine coloring matter represented by the above formula (1) of the present invention are shown in Table 1. The following examples show typical compounds to specifically explain the porphyrazine coloring matter of the present invention and the present invention are not limited thereto. In addition, when the nitrogen-containing heteroaromatic ring of A, B, C or D is a pyridine ring, positional isomers of the nitrogen atom exist as described afterward and synthesis for coloring matter gives a mixture of isomers. It is difficult to isolate these isomers and it is also difficult to identify isomers by analysis. Therefore, the mixture is typically used as intact, and these isomers are not distinguished here and shown by one structural formula for convenience as above because no problem is particularly posed in the present invention in spite of a mixture of isomers.

TABLE 1

| No | A | B | C | D | E | X | Y | b | c |
|---|---|---|---|---|---|---|---|---|---|
| 1 | 2,3-pyrido | Benzo | Benzo | Benzo | Ethylene | 2,5-disulfoanilino | $NH_2$ | 2 | 1 |
| 2 | 2,3-pyrido | 2,3-pyrido | Benzo | Benzo | Ethylene | 2,5-disulfoanilino | $NH_2$ | 1 | 1 |
| 3 | 2,3-pyrido | Benzo | 2,3-pyrido | Benzo | Ethylene | 2,5-disulfoanilino | $NH_2$ | 1 | 1 |
| 4 | 2,3-pyrido | 2,3-pyrido | 2,3-pyrido | Benzo | Ethylene | 2,5-disulfoanilino | $NH_2$ | 0 | 1 |
| 5 | 2,3-pyrido | Benzo | Benzo | Benzo | Ethylene | 4-sulfoanilino | $NH_2$ | 2 | 1 |
| 6 | 2,3-pyrido | Benzo | Benzo | Benzo | Ethylene | 2,5-disulfoanilino | OH | 2 | 1 |
| 7 | 2,3-pyrido | Benzo | Benzo | Benzo | Ethylene | 3,5-dicarboxyanilino | $NH_2$ | 2 | 1 |
| 8 | 2,3-pyrido | Benzo | Benzo | Benzo | Propylene | 2,5-disulfoanilino | $NH_2$ | 2 | 1 |
| 9 | 2,3-pyrido | Benzo | Benzo | Benzo | Ethylene | 2-carboxy-4-sulfoanilino | $NH_2$ | 2 | 1 |
| 10 | 2,3-pyrazino | Benzo | Benzo | Benzo | Ethylene | 2,5-disulfoanilino | $NH_2$ | 2 | 1 |
| 11 | 2,3-pyrazino | 2,3-pyrazino | Benzo | Benzo | Ethylene | 2,5-disulfoanilino | $NH_2$ | 1 | 1 |
| 12 | 2,3-pyrazino | Benzo | 2,3-pyrazino | Benzo | Ethylene | 2,5-disulfoanilino | $NH_2$ | 1 | 1 |
| 13 | 2,3-pyrazino | 2,3-pyrazino | 2,3-pyrazino | Benzo | Ethylene | 2,5-disulfoanilino | $NH_2$ | 0 | 1 |
| 14 | 2,3-pyrido | Benzo | Benzo | Benzo | Ethylene | 2-methoxy-5-sulfoanilino | $NH_2$ | 2 | 1 |
| 15 | 2,3-pyrido | Benzo | Benzo | Benzo | Ethylene | 2-nitro-4-sulfoanilino | $NH_2$ | 2 | 1 |
| 16 | 2,3-pyrido | Benzo | Benzo | Benzo | Ethylene | 2,5-dichloro-4-sulfoanilino | $NH_2$ | 2 | 1 |
| 17 | 2,3-pyrido | Benzo | Benzo | Benzo | Butylene | 2,5-disulfoanilino | $NH_2$ | 2 | 1 |
| 18 | 2,3-pyrido | Benzo | Benzo | Benzo | Ethylene | 3-carboxy-4-hydroxy-5-sulfoaniline | $NH_2$ | 2 | 1 |
| 19 | 2,3-pyrido | Benzo | Benzo | Benzo | Ethylene | 2-sulfoanilino | OH | 2 | 1 |
| 20 | 2,3-pyrido | Benzo | Benzo | Benzo | Ethylene | 3-sulfoanilino | OH | 2 | 1 |
| 21 | 3,4-pyrido | Benzo | Benzo | Benzo | Ethylene | 2,5-disulfoanilino | $NH_2$ | 2 | 1 |
| 22 | 3,4-pyrido | 3,4-pyrido | Benzo | Benzo | Ethylene | 2,5-disulfoanilino | $NH_2$ | 1 | 1 |
| 23 | 3,4-pyrido | Benzo | 3,4-pyrido | Benzo | Ethylene | 2,5-disulfoanilino | $NH_2$ | 1 | 1 |
| 24 | 3,4-pyrido | 3,4-pyrido | 3,4-pyrido | Benzo | Ethylene | 2,5-disulfoanilino | $NH_2$ | 0 | 1 |

The porphyrazine coloring matter of the present invention is typically used alone, however may optionally be used as a mixture with a known cyan coloring matter.

In addition, when the porphyrazine coloring matter of the present invention is used as a cyan coloring matter, it is a preferable aspect that it is used as a mixture of a compound having 1 nitrogen-containing heteroaromatic ring and a compound having 2 or 3 nitrogen-containing heteroaromatic rings and more preferably a mixture of a compound having 1 nitrogen-containing heteroaromatic ring and a compound of 2 nitrogen-containing heteroaromatic rings. As for the ratio of the both in that case, the ratio of the compound having 1 nitrogen-containing heteroaromatic ring is 10 to 100% (based of mass: hereinafter the same unless otherwise specifically noted) preferably 50 to 95% and more preferably 60 to 93%, and the ratio of the compound having 2 or 3 (preferably two) nitrogen-containing heteroaromatic rings is 0 to 90%, preferably 5 to 50%, and more preferably 7 to 40%, approximately, relative to the total of the both.

Further, when it is used as a mixture with a known cyan coloring matter, a phthalocyanine-based coloring matter is preferable as a coloring matter to be mixed. The ratio of the porphyrazine coloring matter of the present invention and the other coloring matter to be used as said mixture can be properly determined according to intended use and the like. For example, relative to said mixture, the porphyrazine coloring matter of the present invention is 1 to 100% (based on mass: hereinafter the same), preferably 10 to 95% and more preferably 20 to 90%, and the rest is another coloring matter, for example, a phthalocyanine-based coloring matter.

The method to produce the compound of the formula (1) of the present invention will be explained.

Firstly, a copper porphyrazine coloring matter represented by the following formula (6) is synthesized.

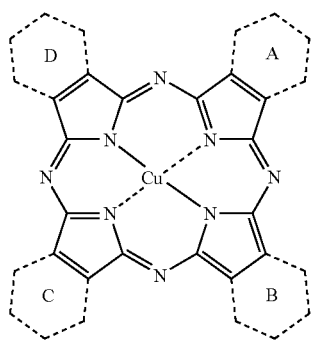

(6)

(wherein, A, B, C and D have the same meanings as above)

In order to synthesize the copper porphyrazine coloring matter represented by the above formula (6), a conventional known manner can be applied. For example, it is obtained by reaction of a nitrogen-containing heteroaromatic ring dicarboxylic acid derivative having aromaticity and a phthalic acid derivative in the presence of catalyst and a copper compound. The number of nitrogen-containing heteroaromatic rings and the number of benzene rings in A, B, C and D can be adjusted by changing the molar ratio in reaction of the nitrogen-containing heteroaromatic ring dicarboxylic acid derivative and the phthalic acid derivative. For example, when 1 to 3 out of 4 aromatic 6-membered rings of A to D in the present invention are nitrogen-containing heteroaromatic rings and the rest are benzene rings, an intended compound can be obtained by that the nitrogen-containing heteroaromatic ring dicarboxylic acid derivative and the phthalic acid derivative are respectively used in a use ratio in the range of 0.25 mol to 0.75 mol according to the content ratio so that the total of the both is 1 mol. For example, in the case of 1 nitrogen-containing heteroaromatic ring and 3 benzene rings, it is advisable the nitrogen-containing heteroaromatic ring dicarboxylic acid derivative is used in a ratio of 0.25 mol and the phthalic acid derivative is used in a ratio of 0.75 mol.

The nitrogen-containing heteroaromatic ring dicarboxylic acid derivative includes a 6-membered nitrogen-containing heteroaromatic ring dicarboxylic acid derivative having carboxy groups or reactive groups derived therefrom at 2 positions side by side (such as an acid amide group, an imide group, an acid anhydride group, a carbonitrile group). Specifically, it includes dicarboxylic acid compounds such as quinolinic acid, 3,4-pyridine dicarboxylic acid and 2,3-pyrazinedicarboxylic acid, acid anhydride compounds such as quinolinic anhydride, 3,4-pyridinedicarboxylic anhydride and 2,3-pyrazinedicarboxylic anhydride, dicarboxamide compounds such as pyridine-2,3-dicarboxamide, dicarboxylic acid monoamide compounds such as pyrazine-2,3-dicarboxylic acid monoamide, acid imide compounds such as quinolinic acid imide, and dicarbonitrile compounds such as pyridine-2,3-dicarbonitrile and pyrazine-2,3-dicarbonitrile. In addition, the phthalic acid derivative includes phthalic acid, phthalic anhydride, phthalamide, phthalamic acid, phthalimide, phthalonitrile, 1,3-diiminoisoindoline, 2-cyanobenzamide and the like.

The synthesis method for copper porphyrazine coloring matter typically includes the nitrile method and Wyler method, which require different reaction conditions and the like. The nitrile method is a method for synthesis of a porphyrazine coloring matter using a dicarbonitrile compound such as pyridine-2,3-dicarbonitrile, pyrazine-2,3-dicarbonitrile and phthalonitrile as material. On the other hand, Wyler method utilizes, as material, a dicarboxylic acid compound such as phthalic acid, quinolinic acid, 3,4-pyridine dicarboxylic acid and 2,3-pyrazinedicarboxylic acid, a acid anhydride compound such as phthalic anhydride, quinolinic anhydride, 3,4-pyridinedicarboxylic anhydride and 2,3-pyradinedicarboxylic anhydride, a dicarboxamide compound such as phthalamide, pyridine-2,3-dicarboxamide, a dicarboxylic acid monoamide compound such as phthalamic acid and pyrazine-2,3-dicarboxylic acid monoamide, and acid imide compounds such as phthalimide and quinolinic acid imide. In Wyler method, addition of urea is essential and the use amount of urea is a molar quantity of 5 to 100 time mol relative to 1 mol of the total amount of the nitrogen-containing heteroaromatic ring dicarboxylic acid derivative and the phthalic acid derivative.

Usually, the reaction is carried out in the presence of a solvent and the nitrile method utilizes, as a solvent, an organic solvent having a boiling point of 100° C. or more, more preferably 130° C. or more. The solvent includes, for example, n-amylalcohol, n-hexanol, cyclohexanol, 2-methyl-1-pentanol, 1-heptanol, 1-octanol, 2-ethylhexanol, N,N-dimethylaminoethanol, benzyl alcohol, ethyleneglycol, propylene glycol, trichlorobenzene, chloronaphthalene, nitrobenzene, quinoline, sulfolane, urea or the like. On the other hand, Wyler method utilizes, as a solvent, an aprotic organic solvent having a boiling point of 150° C. or more, more preferably 180° C. or more. The solvent includes, for example, trichlorobenzene, chloronaphthalene, nitrobenzene, quinoline, sulfolane, urea or the like. The use amount of solvent is 1 to 100 time mass of the total amount of the nitrogen-containing heteroaromatic ring dicarboxylic acid derivative and the phthalic acid derivative.

The catalyst in the nitrile method includes ammonia; a cyclic base such as quinoline or 1,8-diazabicyclo[5,4,0]-7-undecene; amines such as tributylamine and N,N-dimethylaminoethanol; and alkali metal alcoholates such as sodium ethoxide or sodium methoxide. On the other hand, the catalyst in Wyler method includes ammonium molybdate, boric acid and the like. The addition amount is 0.001 to 1 time mol relative to 1 mol of the total amount of the nitrogen-containing heteroaromatic ring dicarboxylic acid derivative and the phthalic acid derivative.

The copper compound includes metal copper or copper compounds such as halide, carboxylate, sulfate, nitrate, acetylacetonate or complexes of copper. The copper compound includes, for example, copper chloride, copper bromide, copper acetate, copper acetylacetonate and the like. The use amount of the copper compound is 0.15 to 0.35 time mol relative to 1 mol of the total amount of the nitrogen-containing heteroaromatic ring dicarboxylic acid derivative and the phthalic acid derivative.

The reaction temperature in the nitrile method is usually 100 to 200° C. and preferably 130 to 170° C. On the other hand, the reaction temperature in Wyler method is 150 to 300°

C. and preferably 170 to 220° C. In addition, the reaction time varies depending on the reaction conditions, however usually 1 to 40 hours. After completion of reaction, the copper porphyrazine coloring matter of the above formula (6) is obtained by filtration, washing and drying.

The present invention will be more specifically explained taking, for an example, the compound (copper dibenzobis(2,3-pyrido)porphyrazine) represented by the above formula (6) where two of A to D are pyridine rings and the rest two are benzene rings.

The copper dibenzobis(2,3-pyrido)porphyrazine represented by the above formula (6) where two of A, B, C and D are pyridine rings and the rest two are benzene rings is obtained by reaction of quinolinic acid (0.5 mol), a phthalic anhydride (0.5 mol), a copper (II) chloride (0.25 mol), ammonium phosphomolybdate (0.004 mol) and urea (6 mol) in a sulfolane solvent at 200° C. for 5 hours. The reactivity varies depending on the kind or the use amount of quinolinic acid, phthalic anhydride, metal compound, solvent, catalyst and the like, not limited to the above.

In addition, when synthesis is carried out by the above methods, the main ingredient is copper dibenzobis(2,3-pyrido)porphyrazine, and five kinds of isomers where the position of the pyridine ring and the position of the pyridine ring-nitrogen atom {the formulas (7-A) to (7-E)} are different are produced. At the same time, copper tribenzo(2,3-pyrido)porphyrazine {the formula (8)} represented by the above formula (6) where one among A to D is a pyridine ring and the rest three are benzene rings and copper benzotris(2,3-pyrido)porphyrazine represented by the above formula (6) where three among A to D are pyridine rings and the rest one is a benzene ring are by-produced and positional isomers of the pyridine ring nitrogen atom {the formulas (9-A) to (9-D)} further exist in these compounds, resulting in a complex mixture. Furthermore, copper tetrakis(2,3-pyrido)porphyrazine and copper phthalocyanine (copper tetrabenzoporphyrazine) are also produced even in an small amount. In general, it is difficult to isolate only the intended product from these mixtures, which are used intact in most cases as copper dibenzobis(2,3-pyrido)porphyrazine because two are pyridine rings and the rest two are benzene rings on average.

In the above description, copper dibenzobis(2,3-pyrido)porphyrazine where two of A to D are pyridine rings and the rest two are benzene rings is mentioned. Even in the case of a nitrogen-containing heteroaromatic ring except for pyridine, the compound where two are said nitrogen-containing heteroaromatic rings and the rest two are benzene rings can be obtained as well by carrying out synthesis according to the above, corresponding to said nitrogen-containing heteroaromatic ring. Moreover, it can be obtained as well, in the case of a compound having 1 or 3 nitrogen-containing heteroaromatic rings; a mixture of a compound having 1 nitrogen-containing heteroaromatic ring and a compound having 2 and/or 3 nitrogen-containing heteroaromatic rings; or the like, by changing the use ratio of the nitrogen-containing heteroaromatic ring dicarboxylic acid derivative and the phthalic acid derivative depending on the ratio of the nitrogen-containing heteroaromatic ring and the benzene ring of the intended compound so that the ratio is in the range of about 0.25 mol to 0.75 mol and the total of the both is 1 mol.

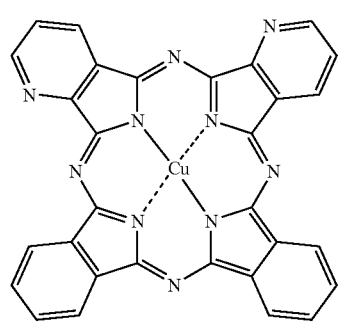

(7-A)

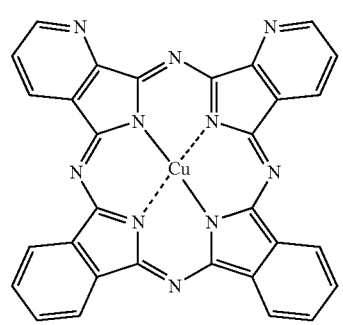

(7-B)

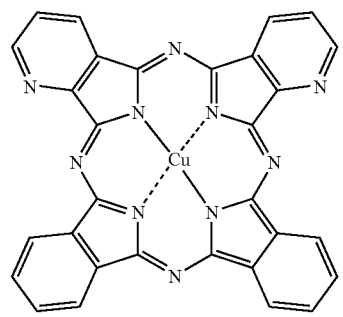

(7-C)

(8)

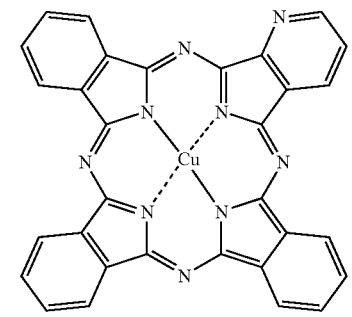

(7-D)

-continued

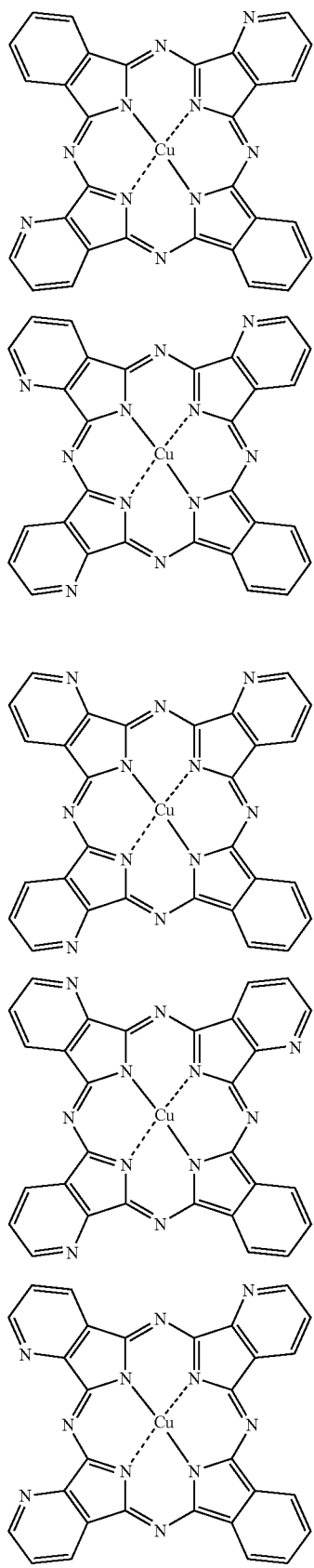

(7-E)

(9-A)

(9-B)

(9-C)

(9-D)

Next, the copper chlorosulfonylporphyrazine compound represented by the formula (3) is obtained by chlorosulfonation of the copper porphyrazine coloring matter represented by the formula (6) in chlorosulfonic acid, or by sulfonation of the copper porphyrazine coloring matter represented by the formula (6) in sulfuric acid or fuming sulfuric acid followed by conversion of the sulfo group into a chlorosulfone group with a chlorination agent. By the above sulfonation, the sulfo group is not introduced on the heteroaromatic ring group but introduced on the benzene ring, in A to D of the formula (6). A sulfo group is typically introduced on a benzene ring, so the number of sulfo groups introduced is within the number of benzene rings. Therefore, the number of chlorosulfone groups (n) in the formula (3) derived from said sulfo group is 1 to 3 corresponding to the number of benzene rings of the compound of the formula (3). The intended compound of the formula (3) can be obtained by another synthesis method of copper chlorosulfonylporphyrazine compound represented by the formula (3), where the copper porphyrazine coloring matter having a sulfo group represented by the formula (10) is synthesized by cyclocondensation with sulfophthalic acid having a sulfo group and a nitrogen-containing heteroaromatic ring dicarboxylic acid derivative such as quinolinic acid, followed by conversion of the sulfo group into a chlorosulfone group. The number of $SO_2Cl$ groups (n) in the obtained compound of the formula (3) is 1 to 3 on average and preferably 2 to 3 on average, as above.

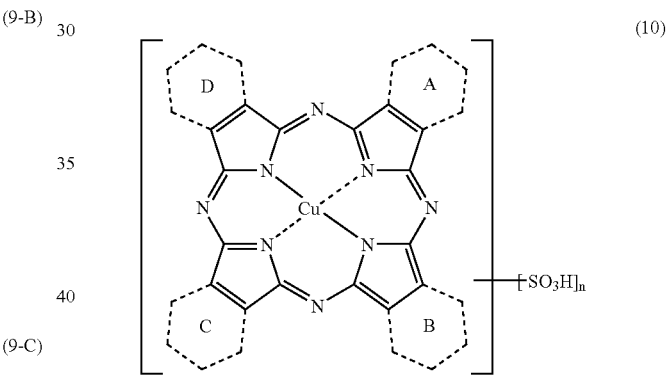

(10)

(wherein, A, B, C, D and n have the same meanings as in the above formula (3))

The conditions of chlorosulfonation reaction of the copper porphyrazine coloring matter are that chlorosulfonic acid is typically used as a solvent and the use amount is 3 to 20 time by weight of the porphyrazine coloring matter and preferably 5 to 10 time by weight. The reaction temperature is typically 100 to 150° C. and preferably 120 to 150° C. The reaction time varies depending to the reaction conditions such as reaction temperature, however typically 1 to 10 hours. In this case, the substituent of the copper porphyrazine compound typically obtained is a mixture of a chlorosulfone group and a sulfo group, so it is preferable in the present invention that a chlorination agent such as thionyl chloride other than chlorosulfonic acid is further added to the reaction solution with chlorosulfonic acid to carry out the reaction so that all the sulfo groups are chlorosulfonated. The amount of the chlorination agent other than the chlorosulfonic acid to be added is about 0.5 to 10 equivalents and preferably 0.5 to 5 equivalents relative to the sulfo group in the sulfo-substituted copper porphyrazine coloring matter. The chlorination agent includes chlorosulfonic acid, thionyl chloride, sulfuryl chloride, phosphorus trichloride, phosphorus pentachloride, phosphorus oxychloride and the like, but not limited thereto.

In addition, the copper chlorosulfonylporphyrazine compound is also obtained by reacting a chlorination agent with the copper porphyrazine coloring matter having a sulfo group represented by the following formula (10) for conversion of the sulfo group into a chlorosulfone group. The solvent to be used for chlorination reaction includes sulfuric acid, fuming sulfuric acid, chlorosulfonic acid, benzene, toluene, nitrobenzene, chlorobenzene, N,N-dimethylformamide, N,N-dimethylacetoamide and the like, but not limited thereto. Further, the chlorination agent includes the same as above. But it is not limited to them.

Next, the intended compound of the formula (1) can be obtained by reaction of the copper chlorosulfonylporphyrazine compound obtained above and the organic amine represented by the following formula (4) in the presence of ammonia (or in the presence of an aminating agent) in a water solvent, typically at pH 8 to 10 and typically 5 to 70° C., typically for 1 to 20 hours. Ammonia or ammonia source to be used for the reaction (the both are also together referred to as an aminating agent) includes, for example, ammonium salts such as ammonium chloride and ammonium sulfate, urea, ammonia water, ammonia gas and the like, but not limited thereto. In addition, the reaction of the copper chlorosulfonylporphyrazine coloring matter, organic amine and an aminating agent is typically carried out in a water solvent.

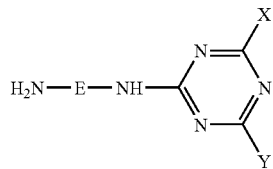

(4)

(wherein, E, X and Y have the same meanings as above)

In this connection, the use amount of organic amine is typically 1 time mol or more of the theoretical value (the mole number required for c value in the formula (1) to be 0.1 to 3) relative to 1 mol of the copper chlorosulfonylporphyrazine coloring matter, but it varies depending on the reactivity of organic amine and the reaction conditions and not limited to these. It is typically 1 to 3 time mol of the theoretical value, and preferably 1 to 2 time mol, approximately.

The method to produce the organic amine represented by the formula (4) will be explained. The organic amine represented by the formula (4) can be produced by a known method. For example, 0.95 to 1.1 mol of a substituted aniline corresponding to X is reacted with 1 mol of 2,4,6-trichloro-S-triazine (cyanuric chloride) in water at pH 3 to 7 and a reaction temperature of 5 to 40° C. for 2 to 12 hours to obtain a first condensate. Next, when Y is an amino group, 1 mol of the obtained first condensate and 0.95 to 2.0 mol of ammonia are reacted at pH 4 to 10 and a reaction temperature of 5 to 80° C. for 0.5 to 12 hours to obtain a second condensate. On the other hand, when Y is a hydroxy group, a hydroxide of an alkali metal such as sodium hydroxide is added to the reaction solution of the first condensate, which is reacted at pH 4 to 10 and a reaction temperature of 5 to 80° C. for 0.5 to 12 hours to obtain a second condensate. Next, 1 mol of the obtained second condensate and 1 to 50 mol of an alkylene diamines corresponding to E are reacted at pH 9 to 12 and a reaction temperature of 5 to 90° C. for 0.5 to 8 hours to obtain a compound of the above formula (4). In condensation, the pH adjuster includes a hydroxide of an alkali metal such as sodium hydroxide or potassium hydroxide, a carbonate of an alkali metal such as sodium carbonate or potassium carbonate, or the like. In this connection, the sequence order of condensation is arbitrarily determined according to the reactivity of each compound and not limited to the above mentioned.

In addition, it can be theoretically considered that, because the copper porphyrazine coloring matter represented by the above formula (1) or (2) is synthesized by reaction of copper chlorosulfonylporphyrazine represented by the above formula (3) and organic amine represented by the above formula (4) in the presence of ammonia, a compound where some of the chlorosulfonyl group in the formula (3) is hydrolyzed with mixing water existing in the reaction system and converted into a sulfonic acid group is by-produced, resulting in that said by-product compound mixes in the intended coloring matter represented by the formula (1) or (2). It is, however, difficult to distinguish unsubstituted sulfamoyl group from sulfonic acid group in mass spectrometric analysis, so in the present invention, chlorosulfonyl groups in formula (3) except for chlorosulfonyl groups reacted with organic amine represented by the formula (4) are all described as converted into unsubstituted sulfamoyl groups.

In addition, some of the copper porphyrazine coloring matter represented by the above formula (1) or (2) may have by-product impurities where copper porphyrazine ring (Pz) forms a dimer (for example, Pz-L-Pz) or a trimer (Pz-L-Pz-L-Pz or the like) via a divalent linking group (L), which is mixed into the reaction product. In this connection, the divalent linking group represented by the above L includes —SO$_2$—, —SO$_2$—NH—SO$_2$— and the like.

The copper porphyrazine coloring matter of the present invention thus obtained can be separated by filtration and the like after aciding out or salting out. Salting out is preferably carried out, for example, under acidic to alkali conditions, preferably in the range of pH 1 to 11. The temperature in salting out is not particularly limited, but it is preferred to heat typically to 40 to 80° C., preferably 50 to 70° C., and then add a sodium chloride and the like for salting out.

The copper porphyrazine coloring matter represented by the above formula (1) or the formula (2) synthesized by the above method is obtained in free acid form or a salt form thereof. Its free acid form can be obtained, for example, by aciding out. On the other hand, its salt form can be obtained by salting out; or for example, by applying a typical salt exchange method of adding a desired organic or inorganic base to its free acid form if the desired salt can not be obtained by salting out.

Next, the ink of the present invention will be explained. The porphyrazine coloring matter of the above formula (1) or the salt thereof produced by the above method exhibits a vivid cyan. Therefore, an ink containing these can be also used mainly as a cyan ink. Said ink can be used not only as a cyan ink having a high concentration but also as a cyan ink having a low concentration of the coloring matter (which is called light cyan ink, photo cyan ink or the like) which is used to reproduce the graduation part of image smoothly or to decrease granular quality of the hypochromic region.

The ink of the present invention is prepared using water as a medium. When ink is an ink for inkjet recording, said porphyrazine coloring matter (hereinafter, when the porphyrazine coloring matter of the present invention is called the porphyrazine coloring matter for simplicity, it means any of a free porphyrazine coloring matter, a salt thereof and a mixture of a free porphyrazine coloring matter and a salt thereof unless otherwise specifically noted) which is used in it preferably contains a small amount of anion such as Cl⁻ and $SO_4^{2-}$. The content is, as the total amount of Cl⁻ and $SO_4^{2-}$, 5% mass or less, preferably 3% mass or less, further preferably 1% mass or less in the porphyrazine coloring matter, and 1% mass or less in the ink, only as a guide. The porphyrazine coloring matter of the present invention having a small content of Cl⁻ and $SO_4^{2-}$ can be produced by desalting treatment, for example, by a typical method using a reverse osmosis membrane or by a method where a dried form or a wet cake of the porphyrazine coloring matter of the present invention is stirred in a mixed solvent of alcohol and water. In the latter case, alcohol to be used is a lower alcohol having a 1 to 4 carbon atoms, preferably an alcohol having 1 to 3 carbon atoms, and further preferably methanol, ethanol or 2-propanol. In desalting treatment of the latter, a method of heating to the boiling point of the alcohol to be used and then cooling for desalination can be also employed. The porphyrazine coloring matter of the present invention having a small content of Cl⁻ and $SO_4^{2-}$ in a dry state can be obtained by that the porphyrazine coloring matter of the present invention subjected to desalting treatment in a mixed solvent of alcohol and water is separated by filtration in an conventional manner and then dried. The content of Cl⁻ and $SO_4^{2-}$ is determined by, for example, an ion chromatography.

The ink of the present invention is an ink for inkjet recording, the porphyrazine coloring matter to be used in it preferably contains a small amount of heavy metal (ion) such as zinc and/or iron; metal (ion) such as calcium; silica; and the like besides the above Cl⁻ and $SO_4^{2-}$ (except for copper which is contained as a central metal atom in a porphyrazine skeleton by ionic bond or coordination bond). Each preferable content of heavy metal (ion), metal (ion) such as calcium, silica and the like which are exemplified above is, for example, about 500 ppm or less in a purified, dried form of the porphyrazine coloring matter, only as a guide. The contents of the above heavy metal (ion), metal (ion), silica and the like are determined by an ion chromatography, an atomic absorption method, or an ICP (Inductively Coupled Plasma) emission spectrometry.

The ink of the present invention contains typically 0.1 to 8% by mass and preferably 0.3 to 6% by mass of the porphyrazine coloring matter of the formula (1). The ink of the present invention may further contain, if needed, a water-soluble organic solvent within the range not to impair the effects of the present invention. Typically, it more preferably contains a water-soluble organic solvent. The water-soluble organic solvent is used as a dye dissolving agent, a drying preventive (wetting agent), a viscosity modifier, a penetration enhancer, a surface tension modifier and/or an antifoaming agent. In addition, additives such as, for example, an antiseptic and fungicide, a pH adjuster, a chelating agent, a rust-preventive agent, an ultraviolet absorber, a viscosity modifier, a dye dissolving agent, an anti-fading agent, an emulsion stabilizer, a surface tension modifier, an antifoaming agent, a dispersing agent, a dispersion stabilizer and the like may be added in the ink of the present invention as the other ink preparation agents. The content of the water-soluble organic solvent (relative to the whole ink) is 0 to 60% by mass and preferably 10 to 50% by mass. The content of ink preparation agents (relative to the whole ink) is 0 to 20% by mass and preferably 0 to 15% by mass. The rest is water.

Said water-soluble organic solvent includes, for example, C1 to C4 alkanol such as methanol, ethanol, n-propanol, isopropanol, n-butanol, isobutanol, secondary butanol or tertiary butanol; carboxylic acid amide such as N,N-dimethylformamide or N,N-dimethylacetoamide; heterocyclic ketone such as 2-pyrolidone, N-methyl-2-pyrolidone, 1,3-dimethylimidazolidin-2-one or 1,3-dimethylhexahydropyrimid-2-one; ketone or keto alcohol such as acetone, methylethylketone, 2-methyl-2-hydroxypentan-4-one; cyclic ether such as tetrahydrofuran or dioxane; mono-, oligo- or poly-alkylene glycol or thioglycol having a (C2 to C6) alkylene unit such as ethylene glycol, 1,2- or 1,3-propylene glycol, 1,2- or 1,4-butylene glycol, 1,6-hexylene glycol, diethylene glycol, triethylene glycol, tetraethylene glycol, dipropylene glycol, thiodiglycol, polyethylene glycol or polypropylene glycol; polyol (triol) such as glycerine or hexane-1,2,6-triol; (C1 to C4) monoalkyl ether of polyhydric alcohol such as ethylene glycol monomethyl ether, ethylene glycol monoethyl ether, diethylene glycol monomethyl ether, diethylene glycol monoethyl ether, diethylene glycol monobutyl ether, triethylene glycol monomethyl ether or triethylene glycol monoethyl ether; γ-butyrolactone, dimethylsulfoxide or the like.

Said water-soluble organic solvent is preferably isopropanol, glycerine, mono- di- or tri-ethylene glycol, dipropylene glycol, 2-pyrolidone or N-methyl-2-pyrolidone, and more preferably isopropanol, glycerine, diethylene glycol or 2-pyrolidone. These water-soluble organic solvents are used alone or as a mixture thereof.

The antiseptic and fungicide includes, for example, organic sulfur-, organic nitrogen-sulfur-, organic halogen-, haloallylsulfone-, iodopropargyl-, N-haloalkylthio-, benzothiazole-, nitrile-, pyridine-, 8-oxyquinoline-, isothiazoline-, dithiol-, pyridineoxide-, nitropropane-, organic tin-, phenol-, quaternary ammonium salt-, triazine-, thiadiazine-, anilide-, adamantane-, dithiocarbamate-, brominated indanone-, benzyl bromoacetate-, inorganic salt-based compounds or the like. The organic halogen-based compound includes, for example, sodium pentachlorophenol; the pyridineoxide compound includes, for example, sodium 2-pyridinethiol-1-oxide; and the isothiazoline compound includes, for example, 1,2-benzisothiazolin-3-one, 2-n-octyl-4-isothiazolin-3-one, 5-chloro-2-methyl-4-isothiazolin-3-one, 5-chloro-2-methyl-4-isothiazolin-3-one magnesium chloride, 5-chloro-2-methyl-4-isothiazolin-3-one calcium chloride, 2-methyl-4-isothiazolin-3-one calcium chloride or the like. The other antiseptic and fungicide includes sodium acetate, sodium sorbate, sodium benzoate (for example, trade name: Proxel GXL(S), Proxel XL-2(S) and the like), manufactured by Avecia Corp.), or the like.

As the pH adjuster, any substance can be used as long as it can control the pH of the ink in the range of 6.0 to 11.0 for the purpose of improving storage stability of the ink. It includes, for example, alkanolamine such as diethanolamine or triethanolamine; hydroxide of alkali metal such as lithium hydroxide, sodium hydroxide or potassium hydroxide; ammonium hydroxide; carbonate of alkali metal such as lithium carbonate, sodium carbonate or potassium carbonate; or the like.

The chelating agent includes, for example, sodium ethylenediamine tetraacetate, sodium nitrilo triacetate, sodium hydroxyethylethylenediamine triacetate, sodium diethylenetriamine pentaacetate, sodium uracil diacetate or the like. The rust-preventive agent includes, for example, acidic sulfite salt, sodium thiosulfate, ammonium thioglycolate, diisopropylammonium nitrite, pentaerythritol tetranitrate, dicyclohexylammonium nitrite and the like.

As the ultraviolet absorber, for example, benzophenone compounds, benzotriazole compounds, cinnamic acid compounds, triazine compounds, stilbene compounds, or compounds which absorb ultraviolet rays and radiate fluorescence typified by benzoxazole compounds, so called fluorescent brightening agent, can be used.

The viscosity modifier includes, besides a water-soluble organic solvent, water-soluble polymer compounds such as, for example, polyvinyl alcohol, cellulose derivatives, polyamines and polyimines.

The dye dissolving agent includes, for example, urea, ε-caprolactam, ethylene carbonate and the like.

The anti-fading agent is used for the purpose of improving storage stability of images. As the anti-fading agent, various organic and metal complex based anti-fading agents can be used. The organic anti-fading agent includes hydroquinones, alkoxyphenols, dialkoxyphenols, phenols, anilines, amines, indanes, chromans, alkoxyanilines, heterocycles or the like, and the metal complex based anti-fading agent includes nickel complexes, zinc complexes or the like.

The surface tension modifier includes surfactants, for example, anionic surfactants, amphoteric surfactants, cationic surfactants, nonionic surfactants and the like. The anionic surfactants include alkylsulfocarboxylate, α-olefin sulfonate, polyoxyethylene alkyl etheracetate, N-acylamino acid and salts thereof, N-acylmethyltaurine salts, alkylsulfate polyoxyalkylether sulfate, alkylsulfate polyoxyethylene alkylether phosphate, rosin acid soap, castor oil sulfate, lauryl alcohol sulfate, alkyl phenol phosphate ester, alkyl phosphate ester, alkyl allylsulfonate, diethyl sulfosuccinate, diethylhexyl sulfosuccinate, dioctyl sulfosuccinate or the like. The cationic surfactants include 2-vinylpyridine derivatives, poly(4-vinylpyridine) derivatives or the like. The amphoteric surfactants include lauryldimethylaminoacetic acid betaine, 2-alkyl-N-carboxymethyl-N-hydroxyethylimidazolinium betaine, coconut oil fatty acid amide propyldimethylaminoacetic acid betaine, polyoctylpolyaminoethylglycine, imidazoline derivatives and the like. The nonionic surfactants include ethers such as polyoxyethylene nonylphenyl ether, polyoxyethylene octylphenyl ether, polyoxyethylene dodecylphenyl ether, polyoxyethylene oleyl ether, polyoxyethylene lauryl ether, polyoxyethylene alkyl ether or the like; polyoxyethylene oleic acid; esters such as polyoxyethylene oleic acid ester, polyoxyethylene distearate, sorbitan laurate, sorbitan monostearate, sorbitan monooleate, sorbitan sesquioleate, polyoxyethylene monooleate or polyoxyethylene stearate; acetylene glycols such as 2,4,7,9-tetramethyl-5-decyne-4,7-diol, 3,6-dimethyl-4-octyne-3,6-diol, 3,5-dimethyl-1-hexyne-3-ol (for example, Surfynol 104, 82 and 465, OlfineSTG and the like manufactured by Nissin Chemical Industry Co., Ltd.); and the like.

As the antifoaming agent, highly oxidized oil-, glycerin fatty acid ester-, fluorine or silicone-based compounds are used if required.

These ink preparation agents are used alone or as a mixture thereof. In addition, the surface tension of the ink of the present invention is typically 25 to 70 mN/m and more preferably 25 to 60 mN/m. Further, the viscosity of the ink of the present invention is preferably 30 mPa·s or less. Furthermore, it is preferably adjusted to 20 mPa·s or less.

In producing the ink of the present invention, the sequence order of dissolving the agents is not limited in particular. In preparing the ink, water to be used is preferably one having a small content of impurities such as ion-exchanged water or distilled water. In addition, foreign substances may be, if required, removed by microfiltration using a membrane filter or the like. In the case that the ink is used for ink for ink jet printer, microfiltration is preferably carried out. The pore size of a filter to for microfiltration is typically 1 micron to 0.1 micron and preferably 0.8 micron to 0.2 micron.

The ink of the present invention can be used to form not only single color images but also full color images. In order to form full color images, the ink of the present invention can be used for an ink set of three primary colors comprising of a magenta ink, a yellow ink and the cyan ink of the present invention, as well as an ink set of four colors where a black ink is added to the above three primary colors. Further, in order to form images with high resolution, the ink of the present invention can be used for an ink set using the cyan ink of the present invention together with a light magenta ink, a blue ink, a green ink, an orange ink, a dark yellow ink, a gray ink and/or the like.

Various coloring matters can be used in the above yellow ink. They include, for example, aryl azo dyes having aryl compounds such as phenols, naphthols or anilines as a coupling component (hereinafter, referred to as coupler component), or heteroaryl azo dyes having heterocycle compounds such as pyrazolone and pyridone; and besides the azo dyes, benzylidene dyes; methine dyes such as monomethine oxonol dye; quinone dyes such as naphthoquinone dye and anthraquinone dye; and the like. In addition, dye species other than them can include quinophthalone dye, nitro nitroso dye, acridine dye, acridinone dye, and the like.

Various coloring matters can be used in the above magenta ink. It can include, for example, aryl azo dyes having an aryl compound such as phenols, naphthols or/and anilines as a coupler component; heteroazo dyes having the above aryl compound as a coupler component; azo methine dyes having pyrazolones or pyrazolotriazoles as a coupler component; and besides the azo dyes, methine dyes such as arylidene dye, styryl dye, merocyanine dye, cyanine dye or oxonol dye; carbonium dyes such as diphenylmethane dye, triphenylmethane dye or xanthene dye; quinone dyes such as naphthoquinone, anthraquinone or anthrapyridone; condensed polycyclic dyes such as dioxazine dye; and the like.

As the above coloring matters, a coloring matter can be used which exhibits each color of yellow, magenta and cyan only after the chromophore is partially dissociated, and its counter cation can be an inorganic cation such as alkali metal and ammonium or an organic cation such as pyridinium or quaternary ammonium salt. Further, it can be a polymer cation having such a cation in the partial structure.

The black coloring matter in the above black ink can include disazo, trisazo or tetraazo dyes as well as a dispersion of carbon black.

The ink of the present invention can be used in recording methods of impress printing, copying, marking, writing, drafting, stamping and the like, and is suitably used especially for a method of inkjet impress printing.

In the inkjet recording method of the present invention, energy is supplied to the ink prepared above to discharge ink droplets on an image receiving material for formation of images. The image receiving material (also optionally referred to as color-receiving material or record-receiving material in the present invention) can include known image receiving materials, i.e., plain paper, resin coating paper, inkjet special paper, glossy paper, glossy film, common use paper for electrophotography, fiber and cloth (such as cellulose, nylon and wool), glass, metal, ceramics, leather or the like.

For the purpose of providing formed images with glossiness and water fastness and improving weatherability, a polymer particle dispersion (also referred to as polymeric latex) may be used. The polymeric latex may be provided to the image receiving material (including record-receiving material) before or after formation of images, or at the same time as formation of images. Therefore, a liquid of polymeric latex alone may be applied to image receiving materials before or after formation of images, or image receiving materials formulated with polymeric latex in advance may be used, otherwise polymeric latex may be formulated in an ink and the ink may be applied to image receiving materials.

The colored article of the present invention is an image receiving material colored with the above porphyrazine coloring matter of the present invention or an ink or the like containing this. The color-receiving material is not limited in particular as long as it is an article which can be colored with the porphyrazine coloring matter of the present invention. It includes, for example, paper, sheet for communication such as film, fiber and cloth (such as cellulose, nylon and wool), leather, substrate for color filter, and the like. Sheet for communication is preferably subjected to surface treatment, and more specifically provided with an ink receiving layer on a substrate such as paper, synthetic paper or film. The ink receiving layer can be provided by impregnating or coating a cation polymer on the above substrate, or by coating inorganic particulates which can absorb the coloring matter in the ink, such as porous silica, aluminasol or special ceramics, together with a hydrophilic property polymer such as polyvinyl alcohol or polyvinylpyrrolidone on the surface of the above substrate. Paper provided with such an ink receiving layer is usually called inkjet special paper (film), glossy paper (film) or the like. Among them, inkjet special paper coated, on the surface of the substrate, with inorganic particulates which can absorb the coloring matter in the ink, such as porous silica, aluminasol or special ceramics, is regarded to be susceptible to gases, such as ozone gas, having oxidizing effect in the air.

For example, some representative examples of such commercially available paper include Pictorico (which is a trade name, manufactured by Asahi Glass Co., Ltd.), Professional Photopaper, Super Photopaper and Matte Photopaper (which are all trade names, manufactured by Canon Inc.), Photo Paper CRISPIA <high-glossy>, Photo Paper <Glossy> and Photo Matte Paper (which are all trade names, manufactured by Seiko-Epson Corporation), Advanced Photo Paper (glossy), Premium Glossy Film and Photo Paper (which are all trade names, manufactured by Hewlett Packard Japan, Ltd.), PhotoLikeQP (which is a trade name, manufactured by KONICA Corporation), High Quality Paper and Glossy Photo Paper (which are all trade names, manufactured by Sony Corporation) and the like. In addition, plain paper can be naturally used.

Any coloring method may be used to obtain the above colored article of the present invention. One of preferable coloring methods is a method where a color-receiving material is colored (recorded) with the above ink using an ink jet printer. Color-receiving material is not limited in particular, and it is the above record-receiving material, or can be any other article as long as it can be colored by an ink jet printer.

In order to record on an image receiving material (which is a record-receiving material in this case) by the inkjet recording method of the present invention, for example, a container containing the above ink may be set in a predetermined position in the ink jet printer and recording may be performed on a record-receiving material in a usual manner. The ink jet printer includes, for example, a piezo inkjet printer utilizing mechanical vibration, a Bubble Jet (registered trademark) type printer utilizing bubbles generated by heating, and the like.

The ink according to the present invention shows no precipitation or/and no separation during storage. In addition, the ink according to the present invention has good discharging property and does not cause injector (ink head) clogging when used in inkjet printing. The ink according to the present invention shows no change in physical property when used in printing for relatively long hours and under constant recirculation by a continuous inkjet printer or in continuous printing by an on-demand printer.

The ink of the present invention is a vivid cyan color and recorded articles excellent particularly in ozone fastness and also excellent in light fastness and water fastness can be obtained by using said ink. It can be possible by using the ink of the present invention for an ink set of dark and light cyan inks and further together with other inks of yellow and magenta excellent in ozone fastness, light fastness and water fastness, if needed, as well as other inks of green, red, orange, blue and the like to exhibit color tones in a wide visible region and to obtain colored articles (recorded products and the like) excellent in ozone fastness and also in light fastness and water fastness.

EXAMPLES

Hereinafter, the present invention will be explained more specifically by Examples. In this connection, "part" and "%" in context are based on mass unless otherwise specifically noted.

In addition, the compounds of the above formula (1) synthesized in Examples are all mixtures containing the isomers and the like as described above, so the compound of the main component (or the chemical structural formula as one of them) is described unless otherwise specifically noted. The described yield is a yield which still contains said isomers and the like.

1. Method of Mass Spectrometric Analysis

Confirmation that the intended compound is produced was carried out by LC-MS (high performance liquid chromatography mass spectrometer). It can be confirmed by LC-MS that the substituted sulfamoyl group in the above formula (1) is introduced. Ion peaks of the compound where one of A to D is a pyridine ring and the compound where two of A to D are pyridine rings, which can be detected by LC-MS, are shown in the following Table 101.

TABLE 101

| Number of pyridine rings | Number of b | Number of c | Molecular weight | Ion peak m/z | Assignment |
|---|---|---|---|---|---|
| 1 | 2 | 1 | 1201 | 1200 | $[(1201-H^+)]^-$ |
|   |   |   |      | 600  | $[(1201-2H^+)/2]^{2-}$ |
|   | 1 | 2 | 1589 | 793.5 | $[(1589-2H^+)/2]^{2-}$ |
|   |   |   |      | 528.7 | $[(1589-3H^+)/3]^{3-}$ |
|   | 0 | 3 | 1977 | 658.7 | $[(1977-3H^+)/3]^{3-}$ |

TABLE 101-continued

| Number of pyridine rings | Number of b | Number of c | Molecular weight | Ion peak m/z | Assignment |
|---|---|---|---|---|---|
| 2 | | | | 754.5 | $[(1511-2H^+)/2]^{2-}$ |
| | 0 | 2 | 1511 | 503 | $[(1511-3H^+)/3]^{3-}$ |
| | | | | 377 | $[(1511-4H^+)/4]^{4-}$ |
| | 1 | 1 | 1123 | 1123 | $[(1123-H^+)]^-$ |
| | | | | 560.5 | $[(1123-2H^+)/2]^{2-}$ |

It is found from Table 101 that monovalent and divalent ion peaks are detected when c is 1. Likewise, divalent and trivalent ion peaks are detected when c is 2, and trivalent ion peak is detected when c is 3, respectively. As just described, there is difference in the ion valence number, but the intended compound represented by the formula (1) can be detected.

In this connection, the synthesized compound is actually a mixture, so the values of b and c are average values determined from the strength of each ion peak.

The compound where two of A to D are pyridine rings can also be likewise confirmed by LC-MS.

LC-MS used here is manufactured by Micromass Ltd. and the model name is LCT, and the measurement conditions are as follows.

Column: Inertsil ODS-II, 2.1 mm×250 mm, φ5 μm
Mobile Phase: (A) 5 mM sodium acetate/H2O, (B) acetonitrile
Gradient: (B) 5%, 30 minutes-50%, 10 minutes-70%
Flow Rate: 0.2 ml/min.
Sample Amount: ca. 500 ppm/H2O, 5 μl
Detection (UV): 220 to 900 nm
Detection (MS): m/z 100 to 1500
Ionization: Negative
Sample Cone: 30V
Rf Lens: 300V 2. ICP Emission Spectrometry (Determination of Copper Content)

Determination of the copper contents of the chelate compounds obtained in Example 1 (2) and Example 2 (1) was carried out by an ICP emission spectrometry.

The specific method is as follows.
Apparatus: SPS 3100 (manufactured by SII Ltd.)
About 0.1 g of the sample was precisely weighed, dissolved with deionized water, and the amount was fixed with a 100 ml measuring flask. From this amount-fixed solution, 1 ml was weighed into a 50 ml measuring flask with a whole pipette, and a certain amount of Y (yttrium) was added thereto as an internal standard material, the amount was fixed with deionized water to 50 ml and then determined by ICP emission spectroscopy.

3. Method of Measuring λmax

Apparatus: UV-2100 (manufactured by Shimadzu Corporation)
1) Measurement in Aqueous Solution
In ion-exchanged water, 0.14 g of the sample was dissolved, the pH was adjusted to the range of 7.0 to 9.0 with sodium hydroxide, and then the amount was adjusted to 500 ml by using a 500 ml measuring flask. With a whole pipette, 10 ml was taken by weighing from this amount-fixed solution into a 100 ml measuring flask, and the amount was fixed with ion-exchanged water to 100 ml, followed by determination.

2) Measurement in Pyridine
Pyridine was added to several mg of the sample until the solid could not be seen by visual observation, and this was measured.

In this connection, every compound measured in pyridine had extremely low solubility in solvent, so the measured value is a reference value.

Example 1
(1) Synthesis of the Compound of the Following Formula (13) (a Compound of the Formula (4) where X is a 2,5-disulfoanilino Group, Y is an Amino Group and E is Ethylene)

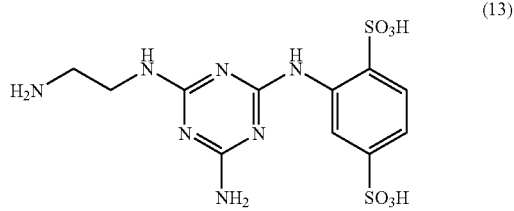

(13)

In 2000 parts of ice water, 7.2 parts of LOTAT OH104-K (which is a trade name, manufactured by Lion Corporation) and 239.9 parts of cyanuric chloride were added and stirred for 30 minutes. Next, 411.6 parts of aniline-2,5-disulfonic acid monosodium salt (purity: 91.2%) is added thereto, and reaction was carried out at 10 to 15° C. for 1 hour and at 27 to 30° C. for 2 hours while adding a 25% sodium hydroxide aqueous solution to maintain pH 2.7 to 3.0. Next, the reaction solution was cooled to 10° C. or less and then a 25% sodium hydroxide aqueous solution was added to adjust to pH 7.0 to 7.5. In this reaction solution, 118.4 parts of 28% ammonia water was added and maintained at 10 to 15° C. and pH 9.5 to 10.0 for 3 hours. Thereafter, concentrated hydrochloric acid was added thereto to adjust to pH 6.0 to 7.0. Next, 2,000 parts of ice was added and cooled to 0° C., whereto 780 parts of ethylenediamine was added dropwise while maintaining a temperature of 5° C. or less. Thereafter, said reaction solution was raised to 10 to 15° C. in temperature and maintained at the same temperature for 1 hour. Subsequently, concentrated hydrochloric acid was added dropwise thereto to adjust to pH 0.9 to 1.0. Meanwhile, the solution was maintained at 10 to 15° C., while adding ice in order not to raise the temperature. Ice was further added to adjust the temperature to 10° C. or less. The fluid amount at this time was 13,000 parts. To this reaction solution, 2,600 parts (20% relative to the solution) of sodium chloride was added and stirred for 1 hour to precipitate a crystal. The precipitated crystal was separated by filtration and washed with 3,000 parts of a 20% sodium chloride aqueous solution to obtain 743.0 parts of a wet cake. (The concentration of the crude intended product in the wet cake: 59.3%, HPLC purity: 93.3%)

(2) Synthesis of Copper tribenzo(2,3-pyrido)porphyrazine (the Following Formula (8): a Compound Represented by the Above Formula (6) where One of A, B, C and D is a Pyridine Ring and the Rest Three are Benzene Rings)

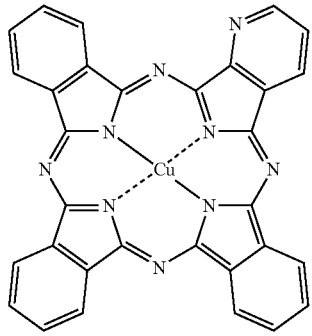

(8)

In a four-neck flask, 250 parts of sulfolane, 22.1 parts of phthalimide, 8.4 parts of quinolinic acid, 72.0 parts of urea, 8.8 parts of copper chloride (II) dihydrate (purity: 97.0%) and 1.0 parts of ammonium molybdate were added, raised to 200° C. in temperature and maintained at the same temperature for 5 hours. After completion of the reaction, the reaction solution was cooled to 75° C. and 200 parts of methanol added thereto to precipitate a crystal, which was separated by filtration. The obtained crystal was washed with 250 parts of methanol and subsequently with 500 parts of hot water to obtain 61.9 parts of a wet cake. The whole amount of the obtained wet cake was added in 500 parts of 5% hydrochloric acid and raised to 60° C. in temperature, and maintained at the same temperature for 1 hour. The crystal was separated by filtration and washed with 300 parts of water. Next, the whole amount of the obtained wet cake was added in 500 parts of 10% ammonia water, the resulting mixture was maintained at 25 to 30° C. for 1 hour, and the crystal was separated by filtration and washed with 300 parts of water to obtain 64.9 parts of a wet cake. The obtained wet cake was dried at 80° C. to obtain 20.9 parts of a blue crystal of a compound of the formula (8).

λmax: 670.5 nm (in pyridine)

| Elemental analysis $C_{31}H_{15}N_9Cu$ | | | | |
| --- | --- | --- | --- | --- |
| | C | H | N | Cu |
| Calculated value (%) | 64.52 | 2.62 | 21.85 | 11.01 |
| Actual value (%) | 63.80 | 2.79 | 20.59 | 10.92 |

(3) Synthesis of Copper tribenzo(2,3-pyrido)porphyrazine trisulfonylchloride (the Following Formula (15): a Compound of the Above Formula (3) where One of A to D is a Pyridine Ring, the Rest Three are Benzene Rings and n is 3)

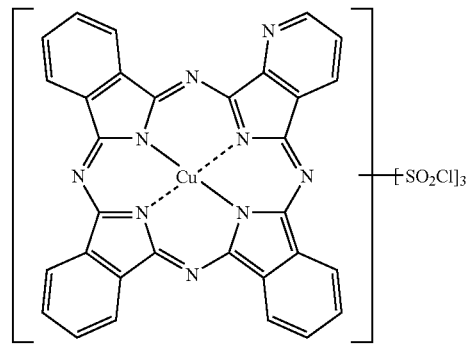

(15)

In 46.2 parts of chlorosulfonic acid, 5.8 parts of copper tribenzo(2,3-pyrido)porphyrazine obtained in the above (2) was added gradually at 60° C. or less while stirring, and the reaction was carried out at 140° C. for 4 hours. Next, the reaction solution was cooled to 70° C., 17.9 parts of thionyl chloride was added dropwise over 30 minutes, and the reaction was carried out at 70° C. for 3 hours. The reaction solution was cooled at 30° C. or less and poured slowly in 500 parts of ice water to precipitate a crystal, which was then separated by filtration and washed with 200 parts of cold water to obtain 71.1 parts of a wet cake of copper tribenzo(2,3-pyrido)porphyrazine trisulfonylchloride.

(4) Synthesis of a Compound of the Following Formula (16) (No. 1 in Table 1: a Compound Represented by the Above Formula (1) where One of A to D is a Pyridine Ring, the Rest Three are Benzene Rings, E is Ethylene, X is a 2,5-disulfoanilino Group, Y is an Amino Group, b is 2.4, and c is 0.6)

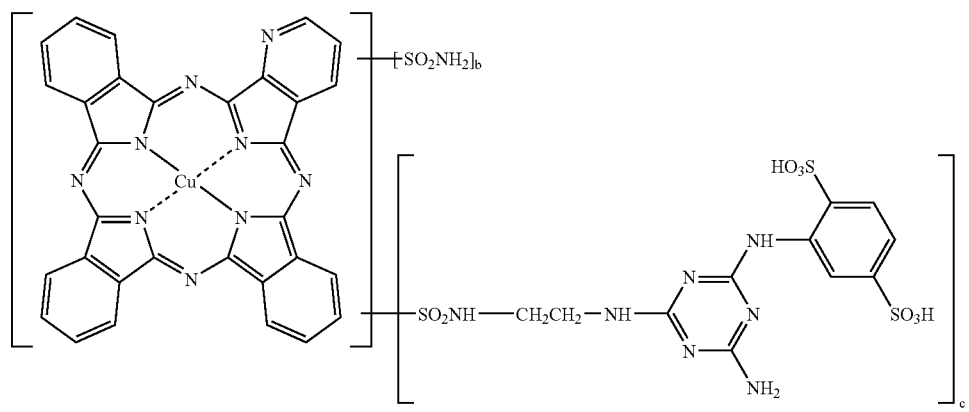

(16)

In 200 parts of ice water, 71.1 parts of a wet cake of copper tribenzo(2,3-pyrido)porphyrazine trisulfonylchloride obtained in (3) of Example 1 and suspended by stirring. Next, 3.0 parts of ammonia water and 20.5 parts of a wet cake (the crude intended product: 59.3%) of the formula (13) obtained in (1) of Example 1 which was dissolving in 100 parts of hot water were added by pouring thereto, and the reaction was carried out at 17 to 20° C. for 6 hours. During the reaction, the reaction solution was maintained at pH 9.0 to 9.3 while adding 28% ammonia water. Thereafter, the reaction solution was raised to 60° C. in temperature. The fluid amount at this time was 500 parts. Thereto was added 100 parts of sodium chloride (20% relative to the solution), and then the pH of the solution was adjusted to 1.0 with a 35% hydrochloric acid aqueous solution to precipitate a crystal. The precipitated crystal was separated by filtration and washed with 100 parts of a 20% sodium chloride aqueous solution to obtain 47.7 parts of a wet cake. This wet cake was dissolved in water to make the whole amount 300 parts, adjusted to pH 9.0 with a sodium hydroxide aqueous solution and then raised to 60° C. in temperature. The fluid amount at this time was 320 parts. Thereto was added 48 parts of sodium chloride (15% relative to the solution), and then the pH of the solution was adjusted to 1.0 with a 35% hydrochloric acid aqueous solution to precipitate a crystal. The precipitated crystal was separated by filtration and washed with 100 parts of a 15% sodium chloride aqueous solution to obtain 47.8 parts of a wet cake. In 250 parts of methanol, 47.8 parts of the obtained wet cake was added and suspended by stirring at 60° C. for 1 hour, and then filtered, washed with 100 parts of methanol and dried to obtain 10.7 parts of a blue crystal of a compound of the formula (16).

λmax: 611 nm (in an aqueous solution)

Example 2

(1) Synthesis of Copper dibenzobis(2,3-pyrido)porphyrazine (a Compound Represented by the Above Formula (6) where Two of A to D are Pyridine Rings and the Rest Two are Benzene Rings)

In a four-neck flask, 250 parts of sulfolane, 14.7 parts of phthalimide, 16.7 parts of quinolinic acid, 72.0 parts of urea, 8.8 parts of copper chloride (II) dihydrate (purity: 97.0%) and 1.0 parts of ammonium molybdate was added, raised to 200° C. in temperature and maintained at the same temperature for 5 hours. After completion of the reaction, the reaction solution was cooled to 85° C., and 200 parts of methanol was added thereto to separate a crystal by filtration. The obtained crystal was washed with 200 parts of methanol and subsequently with 500 parts of hot water, and dried to obtain 24.1 parts of crude copper dibenzobis(2,3-pyrido)porphyrazine as a blue crystal. The whole amount (24.1 parts) of the crystal was added in 500 parts of 5% hydrochloric acid, raised to 60° C. in temperature, and maintained at the same temperature for 1 hour. The crystal was separated by filtration and washed with 100 parts of water. Next, the whole amount of the obtained wet cake was added in 500 parts of 10% ammonia water and maintained at 25 to 30° C. for 1 hour, and the crystal was separated by filtration and washed with 200 parts of water to obtain 44.4 parts of a wet cake. The obtained wet cake was dried at 80° C. to obtain 17.7 parts of copper dibenzobis(2,3-pyrido)porphyrazine as a blue crystal.

λmax: 662.5 nm (in pyridine)

| Elemental analysis $C_{30}H_{14}N_{10}Cu$ | | | | |
|---|---|---|---|---|
| | C | H | N | Cu |
| Calculated value (%) | 62.33 | 2.44 | 24.23 | 10.99 |
| Actual value (%) | 61.46 | 2.62 | 23.35 | 10.37 |

(2) Synthesis of Copper dibenzobis(2,3-pyrido)porphyrazine Disulfonyl Chloride (the Following Formula (17): a Compound of the Above Formula (3) where Two of A to D are Pyridine Rings, the Rest Two are Benzene Rings and n is 2)

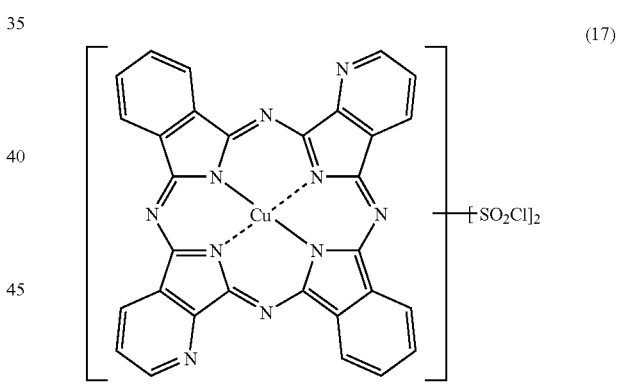

(17)

In 46.2 parts of chlorosulfonic acid, 5.8 parts of copper dibenzobis(2,3-pyrido)porphyrazine obtained in the above (1) was gradually added at 60° C. or less while stirring and the reaction was carried out at 140° C. for 4 hours. Next, the reaction solution was cooled to 70° C., 17.9 parts of thionyl chloride was added dropwise thereto over 30 minutes, and the reaction was carried out at 70° C. for 3 hours. The reaction solution was cooled to 30° C. or less and poured slowly in 500 parts of ice water to precipitate a crystal, which was then separated by filtration and washed with 200 parts of cold water to obtain 46.0 parts of a wet cake of copper dibenzobis (2,3-pyrido)porphyrazine disulfonyl chloride.

(3) Synthesis of a Compound of the Following Formula (18) (a Mixture Containing No. 2 and No. 3 in Table 1: a Compound of the Above Formula (1) where Two of A to D are Pyridine Rings, the Rest Two are Benzene Rings, E is Ethylene, X is a 2,5-disulfoanilino Group, Y is an Amino Group, b is 1.6 and c is 0.4)

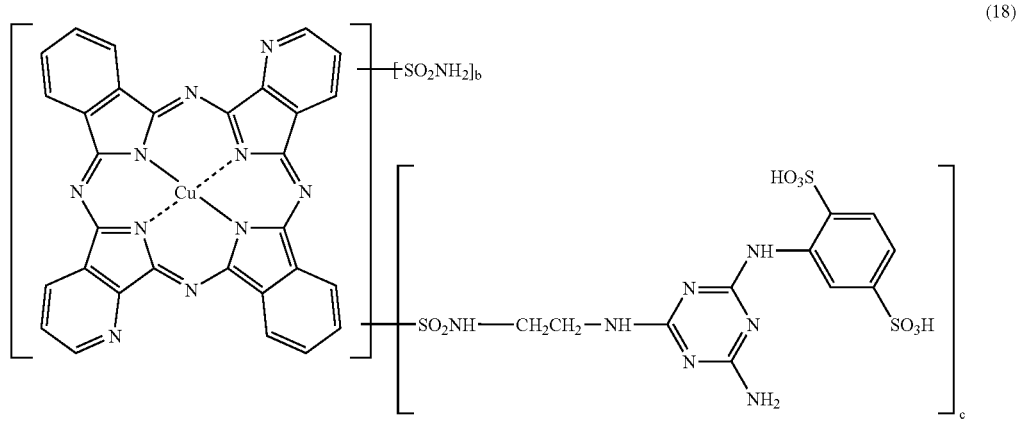

(18)

In 250 parts of ice water, 46.0 parts of a wet cake of copper dibenzobis(2,3-pyrido)porphyrazine disulfonyl chloride obtained in the above (2) was added and suspended by stirring. Next, 4.0 parts of ammonia water and 20.5 parts of a wet cake (the crude intended product: 59.3%) of the formula (13) obtained in (1) of Example 1 which was dissolving in 100 parts of hot water was added by pouring thereto and the reaction was carried out at 17 to 20° C. for 4 hours. During the reaction, the reaction solution was maintained at pH 9.0 to 9.3 while adding 28% ammonia water. Thereafter, the reaction solution was raised to 60° C. in temperature. The fluid amount at this time was 480 parts. Thereto was added 48 parts of sodium chloride (10% relative to the solution), and then the pH of the solution was adjusted to 1.0 with a 35% hydrochloric acid aqueous solution to precipitate a crystal. The precipitated crystal was separated by filtration and washed with 100 parts of a 15% sodium chloride aqueous solution to obtain 86.1 parts of a wet cake. The wet cake was dissolved in water to make the whole amount 400 parts, adjusted to pH 9.0 with a sodium hydroxide aqueous solution, and then raised to 60° C. in temperature. The fluid amount at this time was 410 parts. Thereto was added 41 parts of sodium chloride (10% relative to the solution), and then the pH of the solution was adjusted to 1.0 with a 35% hydrochloric acid aqueous solution to precipitate a crystal. The precipitated crystal was separated by filtration and washed with 100 parts of a 10% sodium chloride aqueous solution to obtain 65.7 parts of a wet cake. In 330 parts of methanol, 65.7 parts of the obtained wet cake was added and suspended by stirring at 60° C. for 1 hour, and then the crystal was separated by filtration, washed with 100 parts of methanol and dried to obtain 9.3 parts of a blue crystal of a compound of the formula (18).

λmax: 602 nm (in an aqueous solution)

Example 3

(1) Synthesis of Copper benzotris(2,3-pyrido)porphyrazine (a Compound Represented by the Above Formula (6) where One of A to D is a Pyridine Ring and the Rest Three are Benzene Rings)

In a four-neck flask, 250 parts of sulfolane, 7.4 parts of phthalimide, 25.1 parts of quinolinic acid, 72.0 parts of urea, 8.8 parts of copper chloride (II) dihydrate (purity: 97.0%) and 1.0 parts of ammonium molybdate were added, and the mixture was raised to 200° C. in temperature and maintained at the same temperature for 5 hours. After completion of the reaction, the reaction solution was cooled to 70° C., and 200 parts of methanol was added thereto to precipitate a crystal, which was separated by filtration. The obtained crystal was washed with 200 parts of methanol and subsequently with 500 parts of hot water and dried to obtain 20.5 parts of crude copper benzotris(2,3-pyrido)porphyrazine (a blue crystal). In 500 parts of 5% hydrochloric acid, 14.5 parts of crude copper benzotris(2,3-pyrido)porphyrazine was added, raised to 60° C. in temperature and maintained at the same temperature for 1 hour. The crystal was filtered and washed with 100 parts of water. Next, the whole amount of the obtained wet cake was added in 500 parts of 10% ammonia water and maintained at 25 to 30° C. for 1 hour, and the crystal was filtered and washed with 100 parts of water to obtain 23.5 parts of a wet cake. The wet cake was dried at 80° C. to obtain 9.7 parts of copper benzotris(2,3-pyrido)porphyrazine (a blue crystal).

λmax: 655 nm (in pyridine)

| Elemental analysis $C_{29}H_{13}N_{11}Cu$ | | | | |
|---|---|---|---|---|
| | C | H | N | Cu |
| Calculated value (%) | 60.15 | 2.26 | 26.60 | 10.97 |
| Actual value (%) | 58.73 | 2.48 | 25.87 | 10.08 |

(2) Synthesis of Copper benzotris(2,3-pyrido)porphyrazine Sulfonyl Chloride Represented by the Formula (19) (a Compound of the Above Formula (3) where Three of A to D are Pyridine Rings, the Rest One is a Benzene Ring and n is 1)

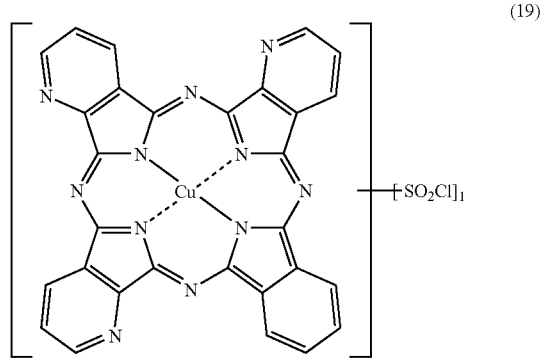

(19)

In 46.2 parts of chlorosulfonic acid, 5.8 parts of crude copper benzotris(2,3-pyrido)porphyrazine obtained in the above (1) was gradually added at 60° C. or less while stirring, and the reaction was carried out at 140° C. for 4 hours. Next, the reaction solution was cooled to 70° C., 17.9 parts of thionyl chloride was added dropwise thereto over 30 minutes, and the reaction was carried out at 70° C. for 3 hours. The reaction solution was cooled to 30° C. or less and poured slowly in 500 parts of ice water to precipitate a crystal, which was filtered and washed with 200 parts of cold water to obtain 33.0 parts of a wet cake of copper benzotris(2,3-pyrido)porphyrazine sulfonyl chloride.

(3) Synthesis of a Compound of the Following Formula (20) (No. 4 in Table 1: a Compound of the Above Formula (1) where Three of A to D are Pyridine Rings, the Rest One is a Benzene Ring, E is Ethylene, X is a 2,5-disulfoanilino Group, Y is an Amino Group, b is 0.9 and c is 0.1)

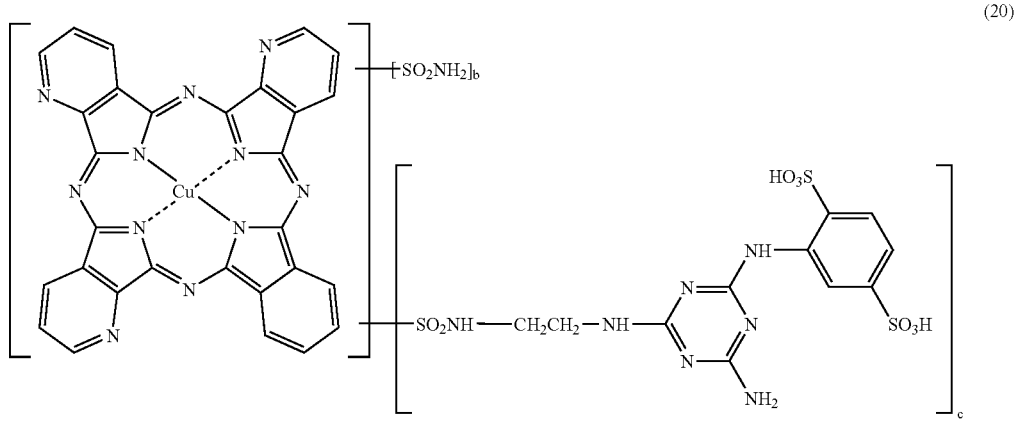

(20)

In 250 parts of ice water, 33.0 parts of a wet cake of copper benzotris(2,3-pyrido)porphyrazine sulfonyl chloride obtained in the above (2) was added and suspended by stirring. Next, 4.0 parts of ammonia water and 20.5 parts of the compound of the formula (13) (purity: 59.3%) obtained in (1) of Example 1 which was dissolving in 90 parts of hot water were added by pouring and the reaction was carried out at 17 to 20° C. for 3 hours. During the reaction, the solution was maintained at pH 9.0 to 9.3 while adding 28% ammonia water. Thereafter, the temperature of the reaction solution was raised to 60° C. The fluid amount at this time was 450 parts. Thereto was added 67.5 parts of sodium chloride (15% relative to the solution), and the pH of the solution was adjusted to 1.0 with a 35% hydrochloric acid aqueous solution to precipitate a crystal. The precipitated crystal was separated by filtration and washed with 100 parts of a 15% sodium chloride aqueous solution to obtain 42.6 parts of a wet cake. This wet cake was dissolved in water to make the whole amount 300 parts, adjusted to pH 9.0 with a sodium hydroxide aqueous solution, and then raised to 60° C. in temperature. The fluid amount at this time was 310 parts. Thereto, 31 parts of sodium chloride (10% relative to the solution) was added, and then the pH of the solution was adjusted to 1.0 with a 35% hydrochloric acid aqueous solution to precipitate a crystal. The precipitated crystal was separated by filtration and washed with 100 parts of a 10% sodium chloride aqueous solution to obtain 42.8 parts of a wet cake. In 220 parts of methanol, 42.8 parts of the obtained wet cake was added and suspended by stirring at 60° C. for 1 hour, and then the crystal was separated by filtration, washed with 100 parts of methanol and dried to obtain 5.0 parts of a blue crystal of a compound of the formula (20).

λmax: 584 nm (in an aqueous solution)

Example 4

(1) Synthesis of Copper tribenzo(2,3-pyrido)porphyrazine Trisodiumsulfonate (the Following Formula (21): a Sodium Salt of a Compound of the Above Formula (10) where One of A to D is a Pyridine Ring, the Rest Three are Benzene Rings and n is 3)

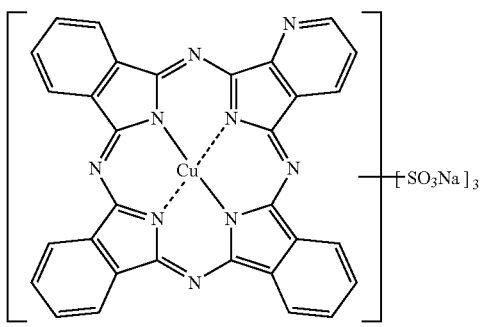

(21)

In a four-neck flask, 250 parts of sulfolane, 73.8 parts of 4-sulfophthalic acid (a 50% aqueous solution, manufactured by Pilot Chemical Company, containing 20% of 3-sulfophthalic acid) and 27.3 parts of 28% ammonia water were added and raised to 160° C. in temperature while distilling water off. Thereafter, said mixture was cooled to 100° C., whereto 8.4 parts of quinolinic acid, 72.0 parts of urea, 8.8 parts of copper chloride (II) dihydrate (purity: 97.0%) and 1.0 parts of ammonium molybdate were added to obtain a mixture, which was raised to 200° C. in temperature and maintained at the same temperature for 5 hours. After completion of the reaction, the reaction solution was cooled to 90° C. and 200 parts of methanol was added to precipitate a crystal, which was separated by filtration. The obtained crystal was washed with 750 parts of methanol to obtain a wet cake. The whole amount of the obtained wet cake was added in a mixed solution of 900 parts of a 28.6% aqueous sodium chloride solution and 100 parts of concentrated hydrochloric acid, raised to 60° C. in temperature and maintained at the same temperature for 1 hour. The crystal in the mixed solution was separated by filtration and washed with a mixed solution of 225 parts of a 28.6% aqueous sodium chloride solution and 25 parts of concentrated hydrochloric acid. Next, the whole amount of the obtained wet cake was added in 500 parts of methanol, and then 50 parts of 28% ammonia water was added thereto, raised to 60° C. in temperature and maintained at the same temperature for 1 hour. The crystal was separated by filtration and washed with 200 parts of methanol to obtain 78.1 parts of a wet cake. Further, the whole amount of the obtained wet cake was added in 500 parts of methanol and then 30 parts of a 25% sodium hydroxide aqueous solution was added thereto, raised to 60° C. in temperature and maintained at the same temperature for 1 hour. The crystal in the mixture was separated by filtration and washed with 200 parts of methanol to obtain 72.6 parts of a wet cake. The obtained wet cake was dried at 80° C. to obtain 32.4 parts of copper tribenzo(2,3-pyrido)porphyrazine trisodiumsulfonate as a blue crystal.

$\lambda$max: 625 nm (in an aqueous solution)

(2) Synthesis of Copper tribenzo(2,3-pyrido)porphyrazine Trisulfonylchloride (the Following Formula (22): a Compound of the Above Formula (3) where One of A to D is a Pyridine Ring, the Rest Three are Benzene Rings and n is 3)

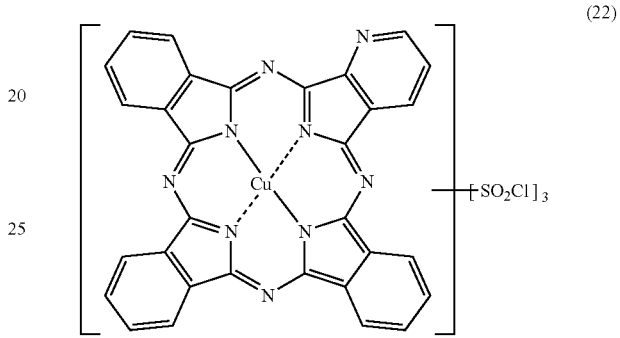

(22)

In 70.6 parts of chlorosulfonic acid, 8.8 parts of copper tribenzo(2,3-pyrido)porphyrazine trisodiumsulfonate obtained in the above (1) was gradually added at 60° C. or less while stirring and the reaction was carried out at 120° C. for 4 hours. Nest, the reaction solution was cooled to 70° C., whereto 17.9 parts of thionyl chloride was added dropwise over 30 minutes, and the reaction was carried out at 70° C. for 3 hours. The reaction solution was cooled to 30° C. or less and poured slowly in 500 parts of ice water to precipitate a crystal which was separated by filtration and washed with 100 parts of cold water to obtain 61.2 parts of a wet cake of copper tribenzo(2,3-pyrido)porphyrazine trisulfonylchloride.

(3) Synthesis of a Compound of the Following Formula (23) (No. 1 in Table 1: a Compound Represented by the Above Formula (1) where One of A to D is a Pyridine Ring, the Rest Three are Benzene Rings, E is Ethylene, X is a 2,5-disulfoanilino Group, Y is an Amino Group, b is 2 and c is 1)

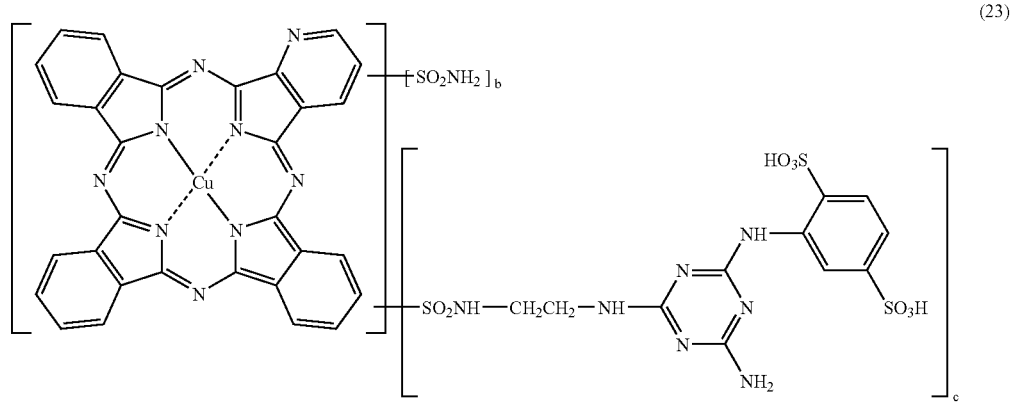

(23)

In 250 parts of ice water, 61.2 parts of the wet cake of copper tribenzo(2,3-pyrido)porphyrazine trisulfonylchloride obtained in the above (2) was added and suspended by stirring. Next, 20.5 parts of the wet cake of the formula (13) (the crude intended product: 59.3%) obtained in (1) of Example 1 which is dissolving in 3.0 parts of ammonia water and 90 parts of hot water was added by pouring in said suspension and the reaction was carried out at 17 to 20° C. for 4 hours. During the reaction, the solution was maintained at pH 9.0 to 9.3 while adding 28% ammonia water. Thereafter, the reaction solution was raised to 60° C. in temperature. The fluid amount at this time was 500 parts. Thereto was added 100 parts of sodium chloride (20% relative to the solution), and then the pH of the solution was adjusted to 1.0 with a 35% hydrochloric acid aqueous solution to precipitate a crystal. The precipitated crystal was separated by filtration and washed with 100 parts of a 20% sodium chloride aqueous solution to obtain 37.0 parts of a wet cake. This wet cake was dissolved in water to make the whole amount 400 parts and the pH of the solution was adjusted at 9.0 and it was raised to 60° C. in temperature. The fluid amount was 400 parts almost without change. Thereto was added 80 parts of sodium chloride (20% relative to the solution), and then the pH of the solution was adjusted to 1.0 with a 35% hydrochloric acid aqueous solution to precipitate a crystal. The precipitated crystal was separated by filtration and was washed with 100 parts of a 20% sodium chloride aqueous solution to obtain 39.2 parts of a wet cake. In 200 parts of methanol, 39.2 parts of the obtained wet cake was added and suspended by stirring at 60° C. for 1 hour and then separated by filtration, washed with 200 parts of methanol and dried to obtain 9.8 parts of a blue crystal of a compound of the formula (23).

λmax: 614 nm (in an aqueous solution)

Example 5

(1) Copper dibenzobis(2,3-pyrido)porphyrazine Disodium Sulfonate (the Following Formula (24): a Sodium Salt of a Compound of the Above Formula (10) where Two of A to D are Pyridine Rings, the Rest Two are Benzene Rings and n is 2)

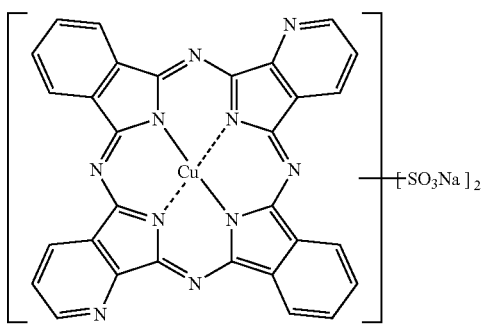

(24)

In a four-neck flask, 250 parts of sulfolane, 49.2 parts of 4-sulfophthalic acid (a 50% aqueous solution, manufactured by Pilot Chemical Company, containing 20% of 3-sulfophthalic acid) and 18.2 parts of 28% ammonia water were added and raised to 160° C. in temperature while distilling water off. Thereafter, said mixture was cooled to 110° C., and 16.7 parts of quinolinic acid, and 72.0 parts of urea, 8.8 parts of copper chloride (II) dihydrate (purity: 97.0%) and 1.0 parts of ammonium molybdate were added thereto, raised to 200° C. in temperature and maintained at the same temperature for 5 hours. After completion of the reaction, the reaction solution was cooled to 70° C., whereto 100 parts of methanol was added to separate a crystal by filtration. The obtained crystal was washed with 150 parts of methanol and dried to obtain 36.9 parts of a blue crystal. The whole amount of the obtained blue crystal was added in a mixed solution of 1,000 parts of a 20% salt solution and 10 parts of concentrated hydrochloric acid, raised to 60° C. in temperature and maintained at the same temperature for 1 hour. Thereafter, a 25% sodium hydroxide aqueous solution was added thereto to adjust to pH 7 to 8 to precipitate a crystal, which was separated by filtration. The whole amount of the obtained wet cake was added in 1,000 parts of water and maintained at 60° C. for 1 hour, whereto 600 parts of methanol was added to precipitate a crystal. The crystal was separated by filtration and washed with 100 parts of methanol to obtain 110.7 parts of a wet cake. The obtained wet cake was dried at 80° C. to obtain 28.9 parts of copper dibenzobis(2,3-pyrido)porphyrazine disodium sulfonate as a blue crystal.

λmax: 607.5 nm (in an aqueous solution)

(2) Synthesis of Copper dibenzobis(2,3-pyrido)porphyrazine Disulfonyl Chloride (the Following Formula (25): a Compound of the Above Formula (3) where Two of A to D are Pyridine Rings, the Rest Two are Benzene Rings and n is 2)

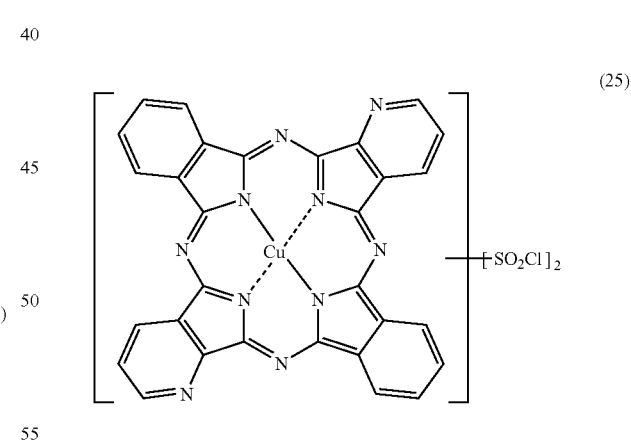

(25)

In 62.6 parts of chlorosulfonic acid, 7.8 parts of copper dibenzobis(2,3-pyrido)porphyrazine disodium sulfonate obtained in the above (1) was gradually added at 60° C. or less while stirring and the reaction was carried out at 120° C. for 4 hours. Next, the reaction solution was cooled to 70° C., whereto 17.9 parts of thionyl chloride was added dropwise over 30 minutes, and the reaction was carried out at 70° C. for 3 hours. The reaction solution was cooled to 30° C. or less and poured slowly in 500 parts of ice water to precipitate a crystal, which was separated by filtration and washed with 200 parts of cold water to obtain 44.3 parts of a wet cake of copper dibenzobis(2,3-pyrido)porphyrazine disulfonyl chloride.

(3) Synthesis of a Compound of the Following Formula (26) (a Mixture Containing No. 2 and No. 3 in Table 1: a Compound of the Above Formula (1) where Two of A to D are Pyridine Rings, the Rest Two are Benzene Rings, E is Ethylene, X is a 2,5-disulfoanilino Group, Y is an Amino Group, b is 1.7 and c is 0.3)

to 1.0 with a 35% hydrochloric acid aqueous solution to precipitate a crystal. The precipitated crystal was separated by filtration and washed with 100 parts of a 20% sodium chloride aqueous solution to obtain 32.0 parts of a wet cake. In 160 parts of methanol, 32.0 parts of the obtained wet cake was added and suspended by stirring at 60° C. for 1 hour, and then the crystal was separated by filtration, washed with 100 parts of methanol and dried to obtain 7.6 parts of a compound (a blue crystal) of the formula (26).

λmax: 609 nm (in an aqueous solution)

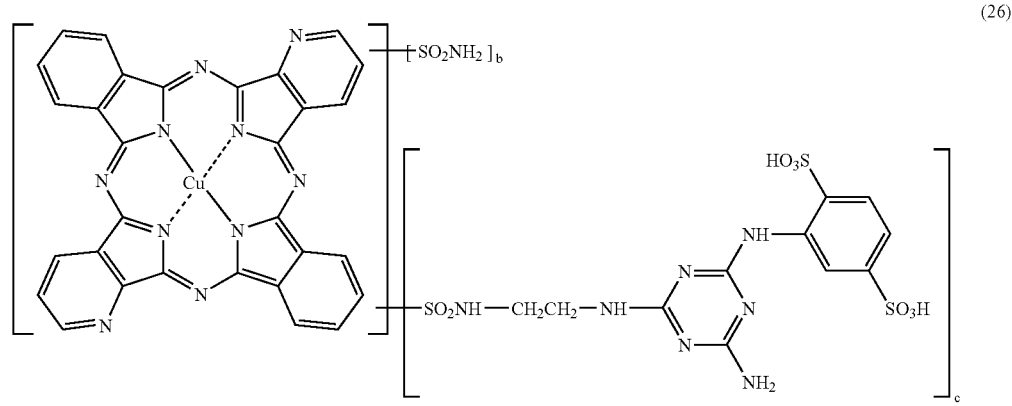

(26)

In 250 parts of ice water, 44.3 parts of the wet cake of copper dibenzobis(2,3-pyrido)porphyrazine disulfonyl chloride obtained in the above (2) was added and suspended by stirring. Next, in the suspension, 5.0 parts of ammonia water and 25.3 parts of the wet cake of the formula (13) (the crude intended product: 59.3%) obtained in (1) of Example 1 which was dissolving in 100 parts of hot water were added by pouring and the reaction was carried out at 17 to 20° C. for 3 hours. During the reaction, the solution was maintained at pH 9.0 to 9.3 while adding 28% ammonia water. Thereafter, it was raised to 60° C. in temperature. The fluid amount at this time was 520 parts. Thereto was added 104 parts of sodium chloride (20% relative to the solution), and then the pH of the solution was adjusted to 1.0 with a 35% hydrochloric acid aqueous solution to precipitate a crystal. The precipitated crystal was separated by filtration and washed with 100 parts of a 20% sodium chloride aqueous solution to obtain 27.6 parts of a wet cake. This wet cake was dissolved in water to make the whole amount 300 parts, adjusted to pH 9.0 with a sodium hydroxide aqueous solution and then raised to 60° C. in temperature. The fluid amount at this time was 310 parts. Thereto was added 62 parts of sodium chloride (20% relative to the solution), and then the pH of the solution was adjusted Example 6

(1) Synthesis of Copper dibenzobis(2,3-pyrazino) porphyrazine Disodium Sulfonate (the Following Formula (27): a Sodium Salt of a Compound of the Above Formula (10) where Two of A to D are Pyrazine Rings, the Rest Two are Benzene Rings and n is 2)

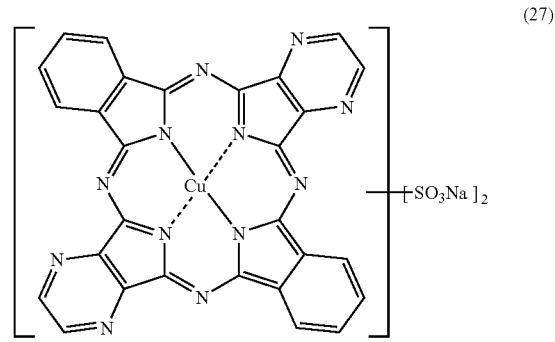

(27)

In a four-neck flask, 250 parts of sulfolane, 49.2 parts of 4-sulfophthalic acid (a 50% aqueous solution, manufactured by Pilot Chemical Company, containing 20% of 3-sulfophthalic acid) and 18.2 parts of 28% ammonia water were added and raised to 160° C. in temperature while distilling water off. Thereafter, this mixture was cooled to 100° C., whereto 16.8 parts of pyrazinedicarboxylic acid, 72.0 parts of urea, 8.8 parts of copper chloride (II) dihydrate (purity: 97.0%) and 1.0 parts of ammonium molybdate were added, raised to 200° C. in temperature and maintained at the same temperature for 5 hours. After completion of the reaction, the reaction solution was cooled to 70° C., whereto 200 parts of methanol was added to separate a crystal by filtration. The obtained crystal was washed with 400 parts of methanol to obtain 55.0 parts of a wet cake. The whole amount of the obtained wet cake was added in a mixed solution of 900 parts of a 28.6% aqueous sodium chloride solution and 100 parts of concentrated hydrochloric acid, raised to 60° C. in temperature and maintained at the same temperature for 1 hour. The crystal was separated by filtration and washed with a mixed solution of 225 parts of a 28.6% aqueous sodium chloride solution and 25 parts of concentrated hydrochloric acid. Next, the whole amount of the obtained wet cake was added in 500 parts of methanol, and then 50 parts of 28% ammonia water was added thereto to obtain a mixture, which was raised to 60° C. in temperature and maintained at the same temperature for 1 hour, and the crystal was separated by filtration, washed with 200 parts of methanol to obtain 34.8 parts of a wet cake. Further, the whole amount of the obtained wet cake was added in 500 parts of methanol and then 30 parts of a 25% sodium hydroxide aqueous solution was added thereto to obtain a mixture, which was raised to 60° C. in temperature and maintained at the same temperature for 1 hour, and the crystal was separated by filtration and washed with 200 parts of methanol to obtain 31.5 parts of a wet cake. The obtained wet cake was dried at 80° C. to obtain 22.2 parts of copper dibenzobis(2,3-pyrazino)porphyrazine disodium sulfonate (a blue crystal).

λmax: 610.5 nm (in an aqueous solution)

(2) Synthesis of Copper dibenzobis(2,3-pyrazino) porphyrazine Disulfonyl Chloride (the Following Formula (28): a Compound of the Above Formula (3) where Two of A to D are Pyrazine Rings, the Rest Two are Benzene Rings and n is 2)

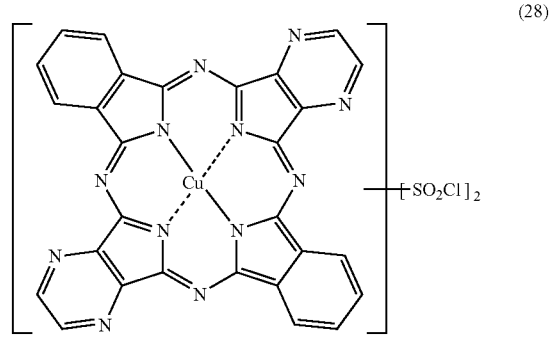

(28)

In 62.7 parts of chlorosulfonic acid, 7.8 parts of copper dibenzobis(2,3-pyrazino)porphyrazine disodium sulfonate obtained in the above (1) was gradually added at 60° C. or less while stirring and the reaction was carried out at 120° C. for 4 hours. Next, the reaction solution was cooled to 70° C., whereto 17.9 parts of thionyl chloride was added dropwise over 30 minutes, and the reaction was carried out at 70° C. for 3 hours. The reaction solution was cooled to 30° C. or less and poured slowly in 500 parts of ice water to precipitate a crystal, which was separated by filtration and washed with 200 parts of cold water to obtain 44.1 parts of a wet cake of copper dibenzobis(2,3-pyrido)porphyrazine disulfonyl chloride.

(3) Synthesis of a Compound of the Following Formula (29) (a Mixture Containing No. 11 and No. 12 in Table 1: a Compound of the Above Formula (1) where Two of A to D are Pyrazine Rings, the Rest Two are Benzene Rings, E is Ethylene, X is a 2,5-disulfoanilino Group, Y is an Amino Group, b is 1.2 and c is, 0.8)

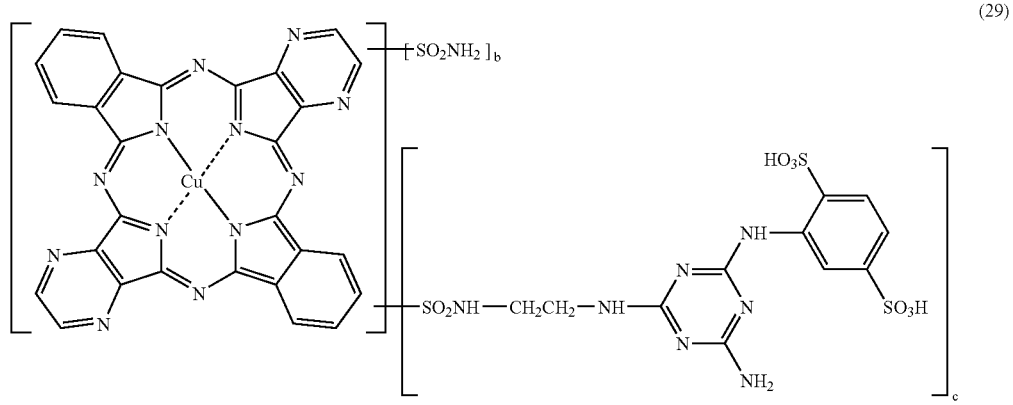

(29)

In 200 parts of ice water, 44.1 parts of the wet cake of copper dibenzobis(2,3-pyrazino)porphyrazine disulfonyl chloride obtained in the above (2) was added and suspended by stirring. Next, 3.0 parts of ammonia water and 20.5 parts of the wet cake of the formula (13) (the crude intended product: 59.3%) obtained in (1) of Example 1 which was dissolving in 100 parts of hot water were added by pouring thereto, and the reaction was carried out at 17 to 20° C. for 2 hours. During the reaction, the solution was maintained at pH 9.0 to 9.3 while adding 28% ammonia water. Thereafter, the temperature of the reaction solution was raised to 60° C. The fluid amount at this time was 450 parts. After addition of 90 parts of sodium chloride (20% relative to the solution), the pH of the solution was adjusted to 1.0 with a 35% hydrochloric acid aqueous solution to precipitate a crystal. The precipitated crystal was separated by filtration and washed with 100 parts of a 20% sodium chloride aqueous solution to obtain 31.7 parts of a wet cake. This wet cake was dissolved in water to make the whole amount 300 parts, adjusted to pH 9.0 with a sodium hydroxide aqueous solution and then raised to 60° C. in temperature. The fluid amount at this time was 320 parts. Thereto was added 64 parts of sodium chloride (20% relative to the solution), and then the pH of the solution was adjusted to 1.0 with a 35% hydrochloric acid aqueous solution to precipitate a crystal. The precipitated crystal was separated by filtration and washed with 100 parts with a 20% sodium chloride aqueous solution to obtain 38.1 parts of a wet cake. In 210 parts of methanol, 38.1 parts of the obtained wet cake was added and suspended by stirring at 60° C. for 1 hour, and then the crystal was separated by filtration, washed with 200 parts of methanol and dried to obtain 8.8 parts of a compound (a blue crystal) of the formula (29).

λmax: 614.5 nm (in an aqueous solution)

Example 7

(1) Synthesis of a Mixture of Copper tribenzo(2,3-pyrido)porphyrazine and Copper dibenzobis(2,3-pyrido)porphyrazine (the Above Formula (8): a Mixture Represented by the Above Formula (6) where 1.5 of A to D are Pyridine Rings and the Rest 2.5 were Benzene Rings)

In a four-neck flask, 250 parts of sulfolane, 18.4 parts of phthalimide, 12.5 parts of quinolinic acid, 72.0 parts of urea, 8.8 parts of copper chloride (II) dihydrate (purity: 97.0%) and 1.0 parts of ammonium molybdate were added, raised to 200° C. in temperature and maintained at the same temperature for 5 hours. After completion of the reaction, the solution was cooled to 65° C., 200 parts of methanol was added to filter a crystal. The obtained crystal was washed with 150 parts of methanol, and subsequently with 200 parts of hot water, and dried to obtain 72.2 parts of a wet cake. The whole amount of the obtained wet cake was added in 500 parts of 5% hydrochloric acid, raised to 60° C. in temperature and maintained at the same temperature for 1 hour. The crystal was filtered and washed with 200 parts of water. Next, the whole amount of the obtained wet cake was added in 500 parts of 10% ammonia water and maintained at 60° C. for 1 hour, and the crystal was filtered and washed with 300 parts of water and 100 parts of methanol to obtain 33.6 parts of a wet cake. The obtained wet cake was dried at 80° C. to obtain 19.8 parts of a mixture of copper tribenzo(2,3-pyrido)porphyrazine and copper dibenzobis(2,3-pyrido)porphyrazine as a blue crystal.

λmax: 663.5 nm (in pyridine)

(2) Synthesis of a Mixture of Copper tribenzo(2,3-pyrido)porphyrazine Trisulfonylchloride and Copper dibenzobis(2,3-pyrido)porphyrazine Disulfonyl Chloride (a Mixture Containing the Above Formulas (17) and (19): a Mixture of the Above Formula (3) where 1.5 of A to D are Pyridine Rings, the Rest 2.5 are Benzene Rings and n is 2.5)

In 46.2 parts of chlorosulfonic acid, 5.8 parts of a mixture of copper tribenzo(2,3-pyrido)porphyrazine and copper dibenzobis(2,3-pyrido)porphyrazine obtained in the above (1) was gradually added at 60° C. or less while stirring, and the reaction was carried out at 140° C. for 4 hours. Next, the reaction solution was cooled to 70° C., 17.9 parts of thionyl chloride was added dropwise thereto over 30 minutes, and the reaction was carried out at 70° C. for 3 hours. The reaction solution was cooled to 30° C. or less and poured slowly in 500 parts of ice water to precipitate a crystal, which was filtered and washed with 200 parts of cold water to obtain 59.3 parts of a wet cake of a mixture of copper tribenzo(2,3-pyrido)porphyrazine trisulfonylchloride and copper dibenzobis(2,3-pyrido)porphyrazine disulfonyl chloride.

(3) Synthesis of a Mixture of Compounds of the Above Formulas (23) and (26) (a Mixture of No. 2, No. 3 and No. 4 in Table 1: a Compound of the Above Formula (1) where 1.5 of A to D are Pyridine Rings, the Rest 2.5 are Benzene Rings, E is Ethylene, X is an 2,5-disulfoanilino Group, Y is an Amino Group, b is 1.7 and c is 0.8)

In 350 parts of ice water, 59.3 parts of the wet cake of the mixture of copper tribenzo(2,3-pyrido)porphyrazine trisulfonylchloride and copper dibenzobis(2,3-pyrido)porphyrazine disulfonyl chloride obtained in the above (2) was added and suspended by stirring. Next, 3.0 parts of ammonia water and 20.5 parts of the wet cake of the formula (13) (the crude intended product: 59.3%) obtained in (1) of Example 1 which was dissolving in 100 parts of hot water were added by pouring, and the reaction was carried out at 17 to 20° C. for 4 hours. During the reaction, the solution was maintained to pH 9.0 to 9.3 while adding 28% ammonia water. Thereafter, the solution was raised to 60° C. in temperature. The fluid amount at this time was 560 parts. After addition of 112 parts of sodium chloride (20% relative to the solution), the pH of the solution was adjusted to 1.0 with a 35% hydrochloric acid aqueous solution to precipitate a crystal. The precipitated crystal was separated by filtration and washed with 100 parts of a 20% sodium chloride aqueous solution to obtain 73.6 parts of a wet cake. The wet cake was dissolved in water to make the whole amount 360 parts, adjusted to pH 9.0 with a sodium hydroxide aqueous solution and then raised to 60° C. in temperature. The fluid amount of this time was 380 parts. After addition of 76 parts of sodium chloride (20% relative to the solution), the pH of the solution was adjusted to 1.0 with a 35% hydrochloric acid aqueous solution to precipitate a crystal. The precipitated crystal was separated by filtration and washed with 100 parts of a 20% sodium chloride aqueous solution to obtain 48.4 parts of a wet cake. In 250 parts of methanol, 48.4 parts of the obtained wet cake was added and suspended by stirring at 60° C. for 1 hour, and then the crystal was separated by filtration, washed with 200 parts of methanol and dried to obtain 10.7 parts of a blue crystal (a mixture of compounds of the formulas (23) and (26)).

λmax: 606 nm (in an aqueous solution)

Example 8

(1) Synthesis of a Mixture of Copper tribenzo(2,3-pyrido)porphyrazine and Copper dibenzobis(2,3-pyrido)porphyrazine (a Mixture Represented by the Above Formula (6) where 1.25 of A to D are Pyridine Rings and the Rest 2.75 are Benzene Rings; a Mixture of Porphyrazine Coloring Matter where the Above Formula (8) is the Main Component)

In a four-neck flask, 270 parts of sulfolane, 20.4 parts of phthalimide, 10.4 parts of quinolinic acid, 72.0 parts of urea, 8.8 parts of copper chloride (II) dihydrate (purity: 97.0%) and 1.0 parts of ammonium molybdate were added, raised to 200° C. in temperature and maintained at the same temperature for 4 hours. After completion of the reaction, the solution was cooled to 65° C., 50 parts of methanol was added thereto to filter a crystal. The obtained crystal was washed with 150 parts of methanol and subsequently with 150 parts of hot water, and dried to obtain 82.5 parts of a wet cake. The whole amount of the obtained wet cake was added in 300 parts of N,N-diethylformamide, raised to 120° C. in temperature and maintained at the same temperature for 1 hour. The crystal was filtered and washed with 150 parts of N,N-diethylformamide and 300 parts of hot water. Next, the whole amount of the obtained wet cake was added in 300 parts of 5% hydrochloric acid, raised to 50° C. in temperature and maintained at the same temperature for 1 hour. The crystal was filtered and washed with 300 parts of hot water. Next, the whole amount of the obtained wet cake was added in 300 parts of 10% ammonia water and maintained at 50° C. for 1 hour, and the crystal was filtered and washed with 300 parts of hot water to obtain a wet cake, which was dried at 80° C. to obtain 17.1 parts of a mixture of copper tribenzo(2,3-pyrido)porphyrazine and copper dibenzobis(2,3-pyrido)porphyrazine as a blue crystal.

(2) Synthesis of a Mixture of Copper tribenzo(2,3-pyrido)porphyrazine Trisulfonylchloride and Copper dibenzobis(2,3-pyrido)porphyrazine Disulfonyl Chloride (a Mixture of Porphyrazine Coloring Matter where the Main Component is a Mixture of the Above Formula (3) where 1.25 of A to D are Pyridine Rings, the Rest 2.75 are Benzene Rings and n is 2.75)

In 46.2 parts of chlorosulfonic acid, 5.8 parts of a mixture of copper tribenzo(2,3-pyrido)porphyrazine and copper dibenzobis(2,3-pyrido)porphyrazine obtained in the above (1) was gradually added at 60° C. or less while stirring and the reaction was carried out at 140° C. for 4 hours. Next, the reaction solution was cooled at 70° C., 17.9 parts of thionyl chloride was added dropwise over 30 minutes thereto, and the reaction was carried out at 70° C. for 3 hours. The reaction solution was cooled to 30° C. or less and poured slowly in 800 parts of ice water to precipitate a crystal, which was filtered and washed with 200 parts of cold water to obtain 39.9 parts of a wet cake of a mixture of copper tribenzo(2,3-pyrido) porphyrazine trisulfonylchloride and copper dibenzobis(2,3-pyrido)porphyrazine disulfonyl chloride.

(3) Synthesis of a Mixture of Compounds of the Above Formulas (23) and (26) (a Mixture of Porphyrazine Coloring Matter where the Main Component is a Compound of the Above Formula (1) where 1.25 of A to D are Pyridine Rings, the Rest 2.75 are Benzene Rings, E is Ethylene, X is an 2,5-disulfoanilino Group and Y is an Amino Group (No. 1, No. 2 or No. 3 in Table 1))

In 350 parts of ice water, 39.9 parts of a wet cake of a mixture of copper tribenzo(2,3-pyrido)porphyrazine trisulfonylchloride and copper dibenzobis(2,3-pyrido)porphyrazine disulfonyl chloride obtained in the above (2) was added and suspended by stirring. Next, 3.0 parts of ammonia water and 13.7 parts of a wet cake of the formula (13) (the crude intended product: 59.3%) obtained in (1) of Example 1 which was dissolving in 100 parts of hot water were added by pouring, and the reaction was carried out at 17 to 20° C. for 4 hours. During the reaction, the solution was maintained at pH 9.0 to 9.3 while adding 28% ammonia water. Thereafter, the solution was raised to 60° C. in temperature. The fluid amount at this time was 700 parts. After addition of 140 parts of sodium chloride (20% relative to the solution), the pH of the solution was adjusted to 1.0 with a 35% hydrochloric acid aqueous solution to precipitate a crystal. The precipitated crystal was separated by filtration and washed with 150 parts of a 20% sodium chloride aqueous solution to obtain 70.4 parts of a wet cake. This wet cake was dissolved in water to make the whole amount 450 parts. The pH of the solution was adjusted to 9.0 with a sodium hydroxide aqueous solution and the solution was raised to 60° C. in temperature. The fluid amount at this time was 450 parts almost without change. Thereto was added 90 parts of sodium chloride (20% relative to the solution), and then the pH of the solution was adjusted to 1.0 with a 35% hydrochloric acid aqueous solution to precipitate a crystal. The precipitated crystal was separated by filtration and washed with 150 parts of a 20% sodium chloride aqueous solution to obtain 49.7 parts of a wet cake. In a mixed solution of 320 parts of methanol and 80 parts of water, 49.7 parts of the obtained wet cake was added and suspended by stirring at 50° C. for 1 hour, and then the crystal was separated by filtration, washed with 100 parts of 90% methanol and dried to obtain 9.7 parts of a mixture (a blue crystal) of compounds of the above formula (23) and (26).

λmax: 604 nm (in an aqueous solution)

Example 9

Evaluation of Ink (A) Preparation of Ink

The ingredients described in the following Table 2 were dissolved by mixing and filtered through a 0.45 μm membrane filter (manufactured by Advantec Co., Ltd) to obtain an ink. In this connection, ion-exchanged water was used as water. In addition, water and a sodium hydroxide (pH adjuster) were added to adjust the pH of the ink to pH=8 to 10 and to make the total amount 100 parts. The ink using the compound of Example 1 is C-1, the ink using the compound of Example 2 is C-2, and the inks using the compounds of Examples 4 to 8 are respectively C-4 to C-8 corresponding to each number of the compounds.

TABLE 2

| Each mixture of porphyrazine coloring matter obtained in the above examples | |
|---|---|
| | 3.0 parts |
| Water + sodium hydroxide | 77.9 parts |
| Glycerine | 5.0 parts |
| Urea | 5.0 parts |
| N-methyl-2-pyrolidone | 4.0 parts |
| IPA (isopropyl alcohol) | 3.0 parts |
| Butylcarbitol | 2.0 parts |
| Surfynol 104PG50 (which is a trade name, manufactured by Nissin Chemical Industry Co., Ltd.) | 0.1 parts |
| Total | 100.0 parts |

As comparative examples, a coloring matter for inkjet recording which is usually used as Direct Blue 199 (product name: Projet Cyan 1, manufactured by Avecia Corp.) (Comparative Example 1); a mixture of coloring matter synthesized and purified in the method described in Example 1 of Patent Literature 8 (Comparative Example 2); and a coloring matter compound synthesized and purified in the method described in Example 3 of Patent Literature 12 (Comparative Example 3) were prepared in the same method as in the above (A) in printing so that their print density were the same as that of the inks of Examples 1 to 5 in Table 1. The ink using the product of Comparative Example 1 is C-A, the ink using the compound of Comparative Example 2 is C-B, and the ink using the product of Comparative Example 3 is C-C. The structural formulas of the compounds of Comparative Example 2 (101) and Comparative Example 3 (102) are shown below.

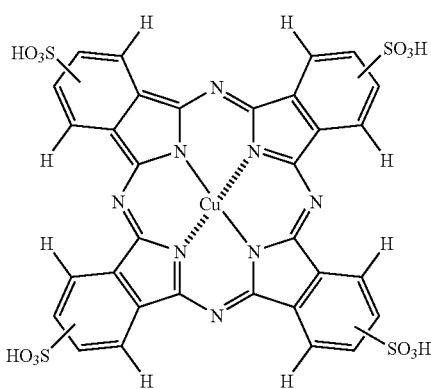

(101)

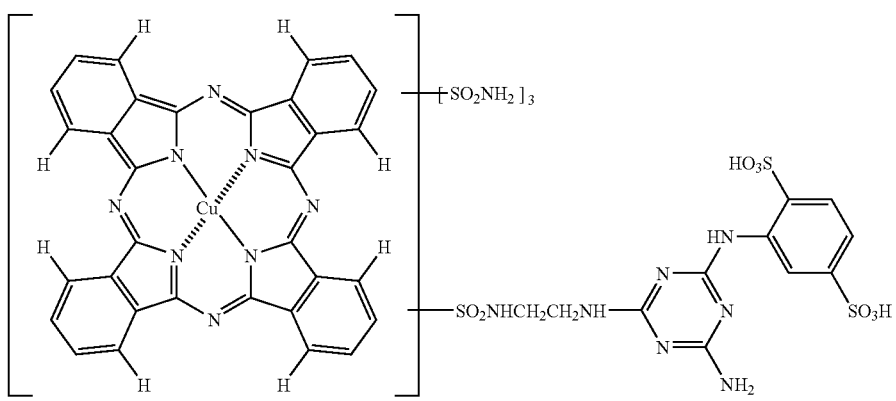

(102)

(B) Inkjet Printing

Using an ink jet printer (manufacture by Canon Inc., trade name: PIXUS ip4100), inkjet recording was performed on two kinds of paper, glossy paper A (manufactured by Hewlett Packard Japan, Ltd., trade name: Advanced Photo Paper (glossy) Q7871A) and glossy paper B (manufactured by Seiko-Epson Corporation, trade name: PMPhoto Paper KA420PSK).

In printing, an image pattern was so made that six gradations, reflection densities of 100%, 85%, 70%, 55%, 40% and 25%, could be obtained, and half-tone printed matter was obtained. In light fastness test and ozone fastness test, a gradation part where the reflection density, D value, of the printed matter was the nearest to 1.0 before the tests was used for measurement.

(C) Evaluation of Recorded Images

1. Evaluation of Hue

Using a calorimetric system (trade name: SectroEye, manufactured by GretagMacbeth), the hues of the recorded image were measured on a* and b* values when L* of the printed matter was in the range of 40 to 80. Evaluation was conducted according to three grades by defining −60 to −20 as preferable a* value and −60 to −20 as preferable b* value.

○: Both a* and b* values are in the preferable range.

Δ: Only either a* value or b* value is in the preferable range.

x: Both a* and b* values are out of the preferable range.

2. Light Fastness Test

Using a xenon weatherometer (manufactured by ATLAS Electric Devices Co., model: Ci4000), the test pieces of recorded image were irradiated for 50 hours under the conditions of a illuminance of 0.36 W/m$^2$, a chamber temperature of 24° C. and a humidity of 60% RH. After the test, the reflection densities before and after the test were measured in the range of 0.70 to 0.85 of reflection density (D value), using a calorimetric system. After the measurement, residual ratio of coloring matter was calculated by (reflection density after the test/reflection density before the test)×100 (%) and evaluation was conducted according to three grades.

○: Residual ratio is 70% or more.

Δ: Residual percentage is less than 70 and 50% or more.

x: Residual percentage is less than 50%.

3. Ozone Fastness Test

Using an ozone weatherometer (manufactured by Suga Test Instruments Co., Ltd., model: OMS-H), the test pieces of recorded image were left for 8 hours under an ozone concentration of 12 ppm, a chamber temperature of 24° C. and a humidity of 60% RH After the test, reflection densities before and after the test were measured in the range of 0.70 to 0.85 of reflection density (D value), using a calorimetric system. After the measurement, residual ratio of coloring matter was calculated by (reflection density after the test/reflection density before the test)×100 (%) and evaluation was conducted according to four grades.

◉: Residual ratio is 90% or more.

○: Residual ratio is less than 85% and 70% or more.

Δ: Residual ratio is less than 70% and 50% or more.

x: Residual ratio is less than 50%.

4. Moisture Fastness Test

The test pieces of recorded image were left for 3 days in a thermo-hygrostat (manufactured by Ohken Co., Ltd), at a chamber temperature of 50° C. and a humidity of 90% RH.

After the test, bleeding of the test pieces was evaluated by visual observation according to three grades.

○: Bleeding is not observed.

Δ: Bleeding is slightly observed.

x: Bleeding is largely observed.

5. Evaluation of Bronzing Resistance

Evaluation of bronzing resistance was conducted by visual observation on which level among six levels of print density, 100%, 85%, 70%, 55%, 40% and 25%, bronzing occurs. OK is marked on an ink causing no bronzing phenomenon. On an ink causing bronzing phenomenon, its lowest density was to be described, but resultingly no bronzing phenomenon occurred on any test pieces, as shown in the following Tables 3 and 4.

The results of hue evaluation, light fastness test, ozone fastness test, moisture fastness test and evaluation of bronzing resistance of ink-recorded images obtained in the above Example 9 are respectively shown in Table 3 (glossy paper A) and Table 4 (glossy paper B).

TABLE 3

Result of ink evaluation: glossy paper A

| Ink number | Hue | Light fastness | Ozone fastness | Moisture fastness | Bronzing resistance |
|---|---|---|---|---|---|
| C-1 | ○ | ○ | ◉ | ○ | OK |
| C-2 | ○ | ○ | ◉ | ○ | OK |
| C-3 | ○ | ○ | ◉ | ○ | OK |
| C-4 | ○ | ○ | ◉ | ○ | OK |
| C-5 | ○ | ○ | ◉ | ○ | OK |
| C-6 | ○ | ○ | ◉ | ○ | OK |
| C-7 | ○ | ○ | ◉ | ○ | OK |
| C-8 | ○ | ○ | ◉ | ○ | OK |
| C-A | ○ | ○ | X | ○ | OK |
| C-B | ○ | ○ | X | ○ | OK |
| C-C | ○ | ○ | ○ | ○ | OK |

TABLE 4

Result of ink evaluation: glossy paper B

| Ink number | Hue | Light fastness | Ozone fastness | Moisture fastness | Bronzing resistance |
|---|---|---|---|---|---|
| C-1 | ○ | ○ | ◉ | ○ | OK |
| C-2 | ○ | ○ | ◉ | ○ | OK |
| C-3 | ○ | ○ | ◉ | ○ | OK |
| C-4 | ○ | ○ | ◉ | ○ | OK |
| C-5 | ○ | ○ | ◉ | ○ | OK |
| C-6 | ○ | ○ | ◉ | ○ | OK |
| C-7 | ○ | ○ | ◉ | ○ | OK |
| C-8 | ○ | ○ | ◉ | ○ | OK |
| C-A | ○ | ○ | X | ○ | OK |
| C-B | ○ | ○ | X | ○ | OK |
| C-C | ○ | ○ | ○ | ○ | OK |

As is clear from Tables 3 and 4, the cyan ink using the compound of the present invention is excellent in hue as well as light fastness, ozone fastness and moisture fastness.

Specifically, the residual ratios of coloring matters of Comparative Examples A and B are less than 50% in ozone fastness test in the case of using any of glossy paper A and B, showing that the inks of Comparative Examples are obviously inferior; those of Comparative Example 3 are similarly 70% or more and less than 85%. The residual ratios of coloring matters in the case of using C-1 to C-8 as the ink of the present invention is, however, all 85% or more, and it is found that C-1 to C-8 are superior to the inks of Comparative Example A to C.

INDUSTRIAL APPLICABILITY

Colored articles colored with the porphyrazine coloring matter of the present invention or the ink using it have good hue as a cyan ink and are excellent in light fastness, ozone fastness and moisture fastness; and further said ink exhibits no crystal precipitation nor change in physical properties and color after storage for a long period of time because of its good storage stability, and cause no clogging nor the like because of its good discharging property even when used in inkjet printing. In addition, the ink of the present invention can exhibit color tone in a wide visible region when used together with other magenta ink and yellow ink. Therefore, the porphyrazine coloring matter of the present invention and the cyan ink using it are extremely useful as a coloring matter and an ink for inkjet recording.

The invention claimed is:

1. A porphyrazine coloring matter represented by the following formula (1) in free acid form,

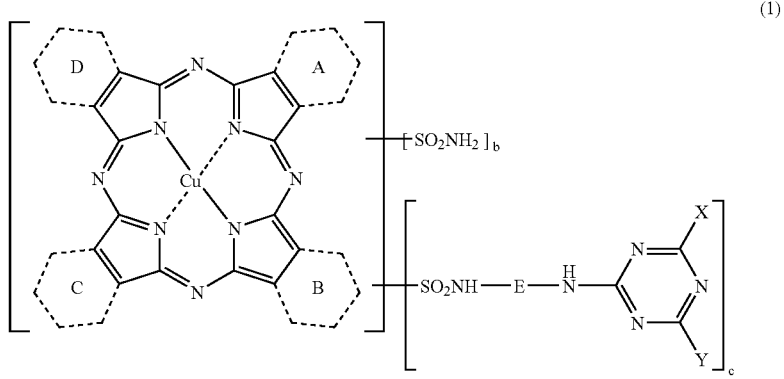

(1)

wherein, A, B, C and D independently represent a 6-membered ring having aromaticity, at least one of them represents a benzene ring and at least one of the rest represents a nitrogen-containing heteroaromatic ring; E represents alkylene, X is a sulfo-substituted anilino group, a carboxy-substituted anilino group or a phosphono-substituted anilino group, said substituted anilino group may further have 0 to 4 substituents of one or more kinds selected from the group consisting of a sulfo group, a carboxy group, a phosphono group, a sulfamoyl group, a carbamoyl group, a hydroxy group, an alkoxy group, an amino group, an alkylamino group, a dialkylamino group, an arylamino group, a diarylamino group, an acetylamino group, a ureide group, an alkyl group, a nitro group, a cyano group, halogen, an alkylsulfonyl group and an alkylthio group, Y represents a hydroxy group or an amino group, b is 0 to 2.9, c is 0.1 to 3, and the sum of b and c is 1 to 3.

2. The porphyrazine coloring matter according to claim 1, wherein the nitrogen-containing heteroaromatic ring is a pyridine ring or a pyrazine ring.

3. The porphyrazine coloring matter according to claim 1 or 2, which is obtained by reaction of a porphyrazine compound represented by the following formula (3):

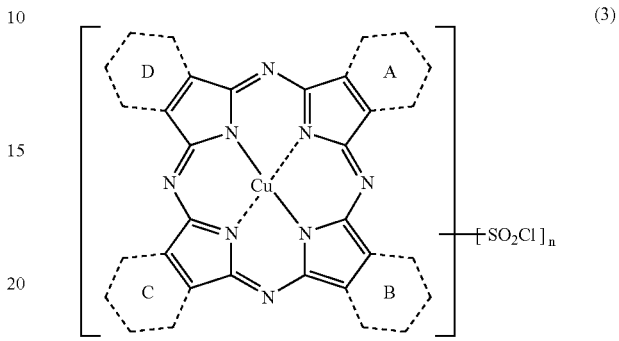

wherein, A, B, C and D have the same meanings as in the formula 1, and n is 1 to 3 and organic amine represented by the following formula (4):

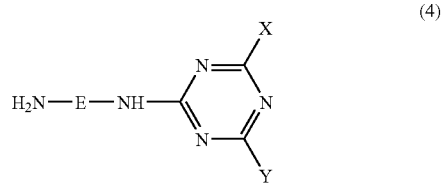

wherein, E, X and Y have the same meanings as in the formula (1) in the presence of ammonia.

4. The porphyrazine coloring matter according to claim 2, wherein 1 to 3 of A, B, C and D are pyridine rings or pyrazine rings and the rest are benzene rings, E represents C2 to C4 alkylene, X is a sulfo-substituted anilino group, a carboxy-substituted anilino group or a phosphono-substituted anilino group, said substituted anilino group may have 0 to 3 substituents of one or more kinds selected from the group consisting of a sulfo group, a carboxy group, a phosphono group, a hydroxy group, an alkoxy group, a nitro group and a chlorine atom, Y represents a hydroxy group or an amino group, b is 0 to 2.9, c is 0.1 to 3, and the sum of b and c is 1 to 3.

5. The porphyrazine coloring matter according to claim 4, wherein E represents ethylene or propylene, X is a sulfo-substituted anilino group or a carboxy-substituted anilino group, Y represents an amino group, b is 0 to 2.9, c is 0.1 to 3, and the sum of b and c is 1 to 3.

6. The porphyrazine coloring matter according to claim 1, wherein A is a pyridine ring fused at the 2-position and the 3-position or at the 3-position and the 4-position, or a pyrazine ring fused at the 2-position and the 3-position, B is a pyridine ring fused at the 2-position and the 3-position or at the 3-position and the 4-position, or a pyrazine ring fused at the 2-position and the 3-position or a benzene ring, C is a pyridine ring fused at the 2-position and the 3-position or at the 3-position and the 4-position, or a pyrazine ring fused at the 2-position and the 3-position or a benzene ring, D is a benzene ring, E is a C2 to C4 alkylene, X is an anilino group having 1 to 3 substituents selected from the group consisting of a sulfo group, a carboxy group, a methoxy group, a nitro group, a chlorine atom and a hydroxy group, Y is an amino group or a hydroxy group, b is 0 to 2.9, and c is 0.1 to 3.

7. The porphyrazine coloring matter according to claim 1 or 2 represented by the following formula (2) in free acid form:

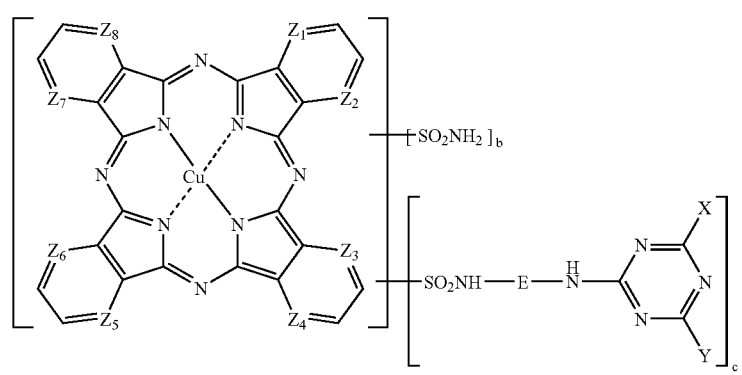

(2)

wherein, each of $Z_1$ to $Z_8$ independently represents a nitrogen atom or a carbon atom, and further at least one of the combinations of $Z_1$ and $Z_2$, $Z_3$ and $Z_4$, $Z_5$ and $Z_6$ and $Z_7$ and $Z_8$ is a combination of carbon atoms and at least one of the rest combinations is a combination of a carbon atom and a nitrogen atom or a combination of nitrogen atoms, E, X, Y, b and c have the same meanings as in the formula (1).

8. The porphyrazine coloring matter according to claim 7, which is obtained by reaction of a porphyrazine compound represented by the following formula (5):

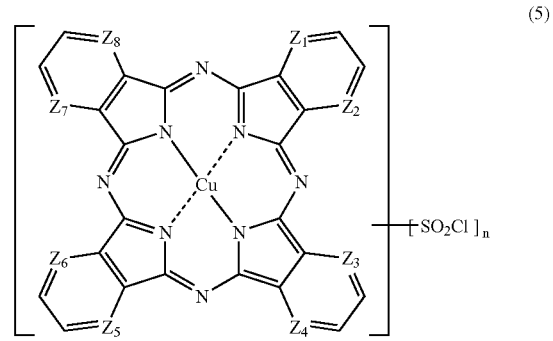

(5)

wherein, $Z_1$ to $Z_8$ have the same meanings as in the formula (2), and n is 1 to 3 and the organic amine represented by the formula (4) according to claim 3 in the presence of ammonia.

9. A mixture of coloring matters containing the porphyrazine coloring matter according to any one of claims 1, 2 or 4 to 7 or the salts thereof.

10. A mixture of coloring matters of the porphyrazine coloring matter according to any one of claims 1, 2 or 4 to 7 and a phthalocyanine coloring matter.

11. An ink characterized by containing the porphyrazine coloring matter according to any one of claims 1, 2 or 4 to 7.

12. The ink according to claim 11, which contains an organic solvent together with the porphyrazine coloring matter.

13. The ink according to claim 11, which is for inkjet recording.

14. An inkjet recording method characterized by utilizing the ink according to claim 11 as ink or an ink set containing the ink in a inkjet recording method where ink droplets are discharged responding to a recording signal to perform recording on a record-receiving material.

15. The inkjet recording method according to claim 14, wherein the record-receiving material is a communication sheet.

16. The inkjet recording method according to claim 15, wherein the communication sheet is a sheet applied with a surface treatment and has an ink image receiving layer containing white inorganic pigment particles on its support.

17. A container containing the ink according to claim 11.

18. An ink jet printer having the container according to claim 17.

19. A colored article colored with the ink according to claim 11.

20. The porphyrazine coloring matter according to claim 1, which is a mixture of a porphyrazine coloring matter where one of A, B, C and D is a nitrogen-containing heteroaromatic ring and the other three are benzene rings and a porphyrazine coloring matter where two of A, B, C and D are nitrogen-containing heteroaromatic rings and the other two are benzene rings.

21. The porphyrazine coloring matter according to claim 20, wherein the nitrogen-containing heteroaromatic ring is a pyridine ring.

* * * * *